Nov. 27, 1956

S. MACHLIN 2,772,351

PLURAL BAND TELEVISION RECEIVER TUNER
WITH CHANNEL INDICATOR KNOB

Filed March 14, 1952

9 Sheets-Sheet 1

INVENTOR
STUART MACHLIN
BY Ostrolenk & Faber
ATTORNEYS

INVENTOR.
STUART MACHLIN

Strolenk & Faber

ATTORNEYS

INVENTOR.
STUART MACHLIN
BY
Ostrolenk & Faber
ATTORNEYS

Nov. 27, 1956

S. MACHLIN

PLURAL BAND TELEVISION RECEIVER TUNER
WITH CHANNEL INDICATOR KNOB 2,772,351

Filed March 14, 1952

9 Sheets-Sheet 4

INVENTOR.
STUART MACHLIN

BY

Ostrolenk & Faber
ATTORNEYS.

Nov. 27, 1956

S. MACHLIN

PLURAL BAND TELEVISION RECEIVER TUNER WITH CHANNEL INDICATOR KNOB 2,772,351

Filed March 14, 1952

9 Sheets-Sheet 5

UHF SYSTEM

| | VHF | UHF | | 290 | | 350 | | 410 | | 470 | | 530 | | 590 | | 650 | | 710 |
|---|---|---|---|---|---|---|---|---|---|---|---|---|---|---|---|---|---|---|
| 156-162 | 6A | 0 | | | 506-512 | 20 | 566-572 | 30 | 626-632 | 40 | 686-692 | 50 | 746-752 | 60 | 806-812 | 70 | 866-872 | 80 |
| 162-168 | 6B | 1 | | | 512-518 | 21 | 572-578 | 31 | 632-638 | 41 | 692-698 | 57 | 752-758 | 61 | 812-818 | 71 | 872-878 | 81 |
| 168-174 | 6C | 2 | | | 518-524 | 22 | 578-584 | 32 | 638-644 | 42 | 698-704 | 52 | 758-764 | 62 | 818-824 | 72 | 878-884 | 82 |
| 174-180 | 7 | 3 | | | 524-530 | 23 | 584-590 | 33 | 644-650 | 43 | 704-710 | 53 | 769-770 | 63 | 824-830 | 73 | 884-890 | 83 |
| 180-186 | 8 | 4 | 470-476 | 14 | 530-536 | 24 | 590-596 | 34 | 650-656 | 44 | 710-716 | 54 | 770-776 | 64 | 830-836 | 74 | | |
| 186-192 | 9 | 5 | 476-482 | 15 | 536-542 | 25 | 596-602 | 35 | 656-662 | 45 | 716-722 | 55 | 776-182 | 65 | 836-842 | 75 | | |
| 192-198 | 10 | 6 | 482-488 | 16 | 542-548 | 26 | 602-608 | 36 | 662-668 | 46 | 722-728 | 56 | 782-788 | 66 | 842-848 | 76 | | |
| 198-204 | 11 | 7 | 488-494 | 17 | 548-554 | 27 | 608-614 | 37 | 668-674 | 47 | 728-734 | 57 | 788-794 | 67 | 848-854 | 77 | | |
| 204-210 | 12 | 8 | 494-500 | 18 | 554-560 | 28 | 614-620 | 38 | 674-680 | 48 | 734-740 | 58 | 794-800 | 68 | 854-860 | 78 | | |
| 210-216 | 13 | 9 | 500-506 | 19 | 560-566 | 29 | 620-626 | 39 | 680-686 | 49 | 740-746 | 59 | 800-806 | 69 | 860-866 | 79 | | |

INVENTOR.
STUART MACHLIN

BY
Ostrolenk & Faber
ATTORNEYS

Nov. 27, 1956 S. MACHLIN 2,772,351

PLURAL BAND TELEVISION RECEIVER TUNER WITH CHANNEL INDICATOR KNOB

Filed March 14, 1952 9 Sheets-Sheet 6

INVENTOR.
STUART MACHLIN

BY
Ostrolenk & Faber
ATTORNEYS

Nov. 27, 1956

S. MACHLIN 2,772,351

PLURAL BAND TELEVISION RECEIVER TUNER
WITH CHANNEL INDICATOR KNOB

Filed March 14, 1952

9 Sheets-Sheet 7

INVENTOR.
STUART MACHLIN

BY
Ostrolenk & Faber
ATTORNEYS

Nov. 27, 1956 S. MACHLIN 2,772,351

PLURAL BAND TELEVISION RECEIVER TUNER WITH CHANNEL INDICATOR KNOB

Filed March 14, 1952 9 Sheets-Sheet 8

INVENTOR.
STUART MACHLIN

BY
Ostrolenk & Faber
ATTORNEYS

Nov. 27, 1956 S. MACHLIN 2,772,351
PLURAL BAND TELEVISION RECEIVER TUNER
WITH CHANNEL INDICATOR KNOB
Filed March 14, 1952 9 Sheets-Sheet 9

INVENTOR.
STUART MACHLIN
BY
Ostrolenk & Faber
ATTORNEYS

United States Patent Office 2,772,351
Patented Nov. 27, 1956

2,772,351

PLURAL BAND TELEVISION RECEIVER TUNER WITH CHANNEL INDICATOR KNOB

Stuart Machlin, Huntington, N. Y., assignor to Standard Coil Products Co., Inc., Los Angeles, Calif., a corporation of Illinois Application March 14, 1952, Serial No. 276,573
8 Claims. (Cl. 250—20)

My present invention relates to turret type television input tuners and more particularly to a simplified turret type television input tuner adapted to receive existing commercially used very high frequency television channels as well as the projected much larger number of ultra-high frequency television channels.

In the construction and operation of turret type television input tuners of the general form shown in prior Patent No. 2,406,183, a turret having twelve sets of removable panels was mounted for rotation on a shaft carried by a chassis with each of the sets of panels being provided with appropriate coils and contacts associated therewith; a set of stationary contacts was arranged linearly exterior of the turret and parallel to the axis thereof so that the contacts of the particular pair of panels at a specific angular position would engage the stationary contacts and complete a channel selector circuit.

This system with its many improvements and modifications has reduced the size and complexity of television input tuners so that they may readily be mounted at the front of the chassis where the largest diameter of the television tube is located without requiring an increase in the size of the chassis and, therefore increasing the size of the cabinet.

Owing to the fact that some 70 ultra-high frequency channels in addition to the 12 very high frequency channels are to be allocated for television use, it has become necessary to devise a television input tuner which will permit selection of these adidtional channels in a space only slightly greater and in some cases no greater than the present space provided for the very high frequency channel tuner. This is in part due to the fact that television sets, their chassis and cabinets have been to a large extent standardized with respect to the proportion of the tube face area to the size of the chassis and the cabinet.

With the addition of approximately 70 channels which will become available on the instruction of the U. H. F., the utilization of the same principle of tuning would require a turret which may even reach a circumference several times the circumference of the turret now used solely for V. H. F. and consequently a chassis for the tuner unit having a transverse width and vertical height several times that of the present structure used solely for V. H. F. This tuning structure could not then be fitted in under the larger front end of the television tube on chassis of existing proportions, nor could it be fitted into cabinets of existing design.

In fact, some television set manufacturers have already provided additional space in their cabinets for the installation of separate U. H. F. tuning elements when they are required.

My present invention relates specifically to a knob system foı use with turret type tuners especially of the kind described in the application Serial No. 273,720.

In the above mentioned invention, all the U. H. F. channels are first divided into a number of bands (8 in this embodiment), each band comprising a preselected number of U. H. F. channels (in this embodiment there will be six channels in the first band, ten in the next six bands and four in the eighth band). All the U. H. F. frequencies in a desired band, and if the band is for example the third, there will be ten of such frequencies, are simultaneously converted by my novel tuner from their original U. H. F. level to a V. H. F. level so that their new V. H. F. carriers correspond in this particular embodiment to ten preset V H. F. circuits.

One of these converted U. H. F. signals is now selected by means of its corresponding V. H. F. circuit and converted to the intermediate frequency of the television set. In other words, my present invention contemplates in the operation for reception of U. H. F. channels a first tuning operation to select the band in which the desired U. H. F. channel is located.

By this means, actually ten U. H. F. channels are received and converted to V. H. F. signals, the desired U. H. F. channel being one of these ten U. H. F. channels. The second tuning operation now brings about the desired U. H. F. channel selection from the above-mentioned ten U. H. F. channels. The latter operation is performed by selecting among the new V. H. F. signals, the one signal which corresponds to the desired U. H. F. channel.

The above mentioned invention was directed to a VHF-UHF television input tuner wherein, instead of merely multiplying the number of panels to be used in the tuner and thereby multiplying the size of the unit, two separate turrets are used inter-related electrically and mechanically so that a decimal type of operation is obtained; that is, one turret having an appropriate number of panels is utilized for the V. H. F. channels; another turret with, in the present instant, eight panels, is utilized in combination with the first turret for the U. H. F. channels.

Thus, the original twelve channels can be received on the first turret. The second turret is so arranged that each panel will prepare the unit to receive a set of bands or channels while the first turret will then be utilized to select channels or bands in the U. H. F. range from the set predetermined by the second turret.

The first turret has its tuning coils and other elements so constructed that individual sets of panels can be utilized to tune in the twelve different V. H. F. channels. But when combined with the U. H. F. turret, the V. H. F. turret acts as the units portions of a decade mechanism. The U. H. F. turret may then, for example, be operated so that one panel will set the tuning mechanism to receive, for instance, channels 50 to 59. Then when the circuits have been switched to this decade function, ten of the panels of the V. H. F. turret may be utilized to enable the operator to select individually, channels 50, 51, 52, 53, 54, 55, 56, 57, 58 and 59 from the set of channels 50 to 59.

Where eight tuning panels are used on the U. H. F. turret and when ten of the larger number of tuning panels on the V. H. F. turret are used in combination with the various panels on the U. H. F. turret, it will be seen that seventy additional U. H. F. tuning circuits are made available by the combination of the two turrets besides the twelve existing V. H. F. channels or a total of eighty-two channels.

It would at first appear that by this decade mechanism and the utilization of two turrets, the original twelve panels required in a V. H. F. tuner are increased only to twenty panels in V. H. F. and U. H. F. However, owing to the gap or wide space in frequency between V. H. F. channels 6 and 7, it is desirable, in order to make the decade system operative, that the three additional frequencies are placed just below channel 7. It was there found that a minimum of an additional three panels are required for these turrets. While these three positions were chosen as most suited for my purpose, other positions such as above channel 13 may be used for some of all of those here selected. Indeed, any possible combination of ten frequencies either utilizing exist- V. H. F. or newly created frequencies or combination of both may be use.

These panels while they are placed on the V. H. F. turret increasing the number of panels on the V. H. F. turret to fifteen are not used for V. H. F. channel selector purposes but are only used in connection with the U. H. F. in the decade system.

In addition, although this particular way of performing the operation may be varied, it was found that a simplified switching means may be utilized, controlled by the U. H. F. turret, and a space was therefore allocated having an angular width of one panel on the U. H. F. turret for switching purposes, thereby effectively increasing the number of panel spaces on the U. H. F. turret to nine.

Instead of a total of eighty-two panels for selecting eighty-two channels, a maximum of twenty-four panels on two turrets may be used for all channel selecting purposes as well as for switching from one set of channels to the other. Other arrangements coming within the decade principle of this invention requiring more than twenty-four panels may be employed.

This arrangement which provides for two turrets which are axially aligned with each other makes it possible to retain substantially the width and height of the original twelve channel turret type input tuner. These are the significant dimensions.

It happens that the widest portion of the television tube itself is always at the front of the set. The chassis is, therefore, necessarily designed so that most of the apparatus which need not be manually operated is carried on the chassis at some distance from the front of the set, while the manually operable apparatus, particularly the input tuner, is carried at the front of the set.

Since the chassis is flat, the tube face is circular and the cabinet box-like in shape, the present turret type twelve channel input tuner, owing to the dimensional arrangements above mentioned, may be located at the front of the set at a point located to one side of a vertical diameter of the television tube face and below a horizontal diameter thereof and fitted into the segment of the box-like cabinet at the front thereof not occupied by the substantially circular television tube face.

Even where a rectangular television tube is used, the small dimension of the tuning device enables its location at a point which will make possible a reduction in the size of the cabinet. This important dimension has to do with the height and width of the cabinet.

Longitudinally, fore and aft in the cabinet, it is possible to rearrange the elements to provide additional space for a particular unit where required without increasing the size of the cabinet.

By means of my novel decade type tuner operation, utilizing coaxially aligned turrets, it is possible, while using the same size cabinet, chassis and tube, to increase the channel selecting capabilities of the television set from twelve channels to eighty-two channels.

Heretofore, U. H. F. tuners were provided with a U. H. F. oscillator to produce by one mixing operation, a signal having a carrier frequency equal to the television set intermediate frequency (20–25 megacycles). It is also well-known that at those high frequencies, mixing can be economically performed only by means of crystal mixers which have a conversion gain less than one. Actually, the conversion loss due to the crystal mixer is approximately 6 db.

It will be pointed out that R. F. amplifiers can be used before conversion by proper redesign.

The above mentioned tuner provides, moreover, the highest possible voltage amplification before the signals reach the I. F. amplifier of the television chassis. This is obtained by the use of double conversion with a crystal mixer in the first conversion and a multi-electrode electron tube in the second conversion and by suitable circuit configuration, more specifically by the use of an incremental tuning band preselector.

An impedance transformation is, in fact, performed by my novel band preselector from a low value (for example 50 ohms) to a high level (for example 300 ohms). This causes the U. H. F. signals reaching the mixer to be of higher voltage than when received by the antenna.

In previous television tuners, the oscillators had to be tuned at each channel in which the spectrum was divided if the tuner was not of the continuous tuning type. In the continuous tuning type tuners, on the other hand, it is found that the television oscillators have difficulties in tracking due to the dial and to the preselector circuit.

In the above mentioned tuner, on the other hand, the U. H. F. oscillator is connected to a fixed circuit to which other electrical components may be successively connected. When the U. H. F. oscillator is connected only to the fixed circuit, it oscillates at a preset frequency, located approximately in the center of its range of operation.

When the U. H. F. oscillator is connected to the fixed circuit and additional electrical components are connected to it, the oscillator will oscillate at a new preselected frequency from preselected one. Therefore, by connecting additional and diverse electrical components to this U. H. F. oscillator, a series of frequencies of oscillations may be obtained with what may be called incremental tuning.

In order to tune my novel television U. H. F. oscillator, it is then only necessary to tune it at the above mentioned preselected frequency since then it will resonate at all the other desired frequencies corresponding to the additional electrical components. For example, if the preselected frequency is 470 megacycles and the oscillator has to be oscillated at 290, 350, 410, 530, 590, 650 and 710 megacycles in order to tune it so that it does actually oscillate at the above frequencies, it is necessary to first tune the U. H. F. oscillator so that it oscillates at 470 megacycles. When this is obtained, the oscillator will resonate correctly at all the other mentioned frequencies. For extreme precision, independent adjustments of capacitance and inductance of the basic oscillator must be made although, in practice, one adjustment is sufficient.

My novel knob consists essentially of two discs, each having a set of numbers. One of these discs, the U. H. F. one is provided with numbers from 1 to 8 where each number represents a band in which the U. H. F. range has been divided. The other disc, the V. H. F. one, carries two sets of numbers positioned on two circles of different radius. One set of these numbers corresponds to the V. H. F. channels plus the above mentioned three positions located between V. H. F. channels 6 and 7. The other set of numbers comprises all digits from zero to nine so that when used in combination with the numbers on the U. H. F. disc, which on the other hand has numbers corresponding to tens, provides a decimal system of numbers for the U. H. F. channels which goes from number 14 to number 79.

My novel knob is also provided in one of its embodiments with a shield or mask so that when a V. H. F. channel is desired, the U. H. F. channel numbers are obscured and when, on the other hand, the U. H. F. channel is desired, the V. H. F. channel numbers are similarly obscured.

One object of my present invention is, therefore, a knob system for giving visual indication of V. H. F.-U. H. F. channel numbers while performing the selections of 82 channels by the use of no more than two knobs or discs. To provide even better visual indication, the above mentioned disc will be substituted with frustrated comb sections carrying numbers on the outer comb surface or, they may be substituted by a system of lights which illuminates whatever channel is desired by appropriate rotation of a system of knobs.

Another object of my present invention is a knob system for giving visual indication of U. H. F.-V. H. F. channel numbers which permits reading of such numbers while the operator is in a higher position than the knob itself.

A further object of my present invention is a knob system for giving visual indication of V. H. F.-U. H. F. channel numbers by illuminating the desired U. H. F. or V. H. F. channel number.

While it was mentioned above that the U. H. F. disc is provided with eight numbers, it was pointed out that actually the U. H. F. disc has a 9th position which serves to operate a switch for switching the television tuner from U. H. F. to V. H. F. operation.

Still another object of my present invention is, therefore, a system of knobs for giving visual indication of V. H. F.-U. H. F. channel numbers while performing at the same time a switching operation depending on whether a V. H. F. or U. H. F. channel is desired.

The foregoing and many other objects of my invention will become apparent in the following description and drawings in which:

Figure 1 is a schematic view showing the formation of my novel decade type television input tuner.

Figure 1*a* is a diagram illustrating the basic switching function for my novel television input tuner in order to prepare it to receive V. H. F. signals or U. H. F. signals.

Figure 4:
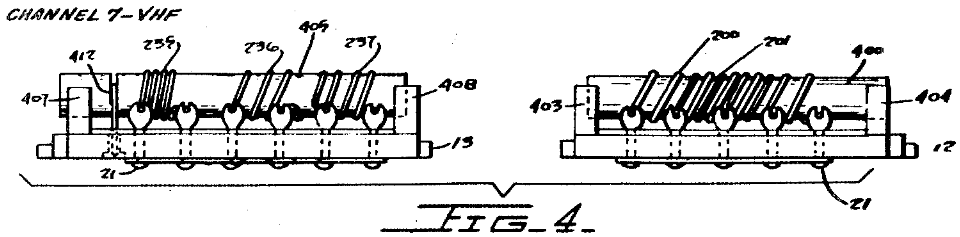

Figure 4 is a view of a pair of channel selector coils mounted on their associated panels adapted to receive channel 7 in the V. H. F. band.

Figure 5:
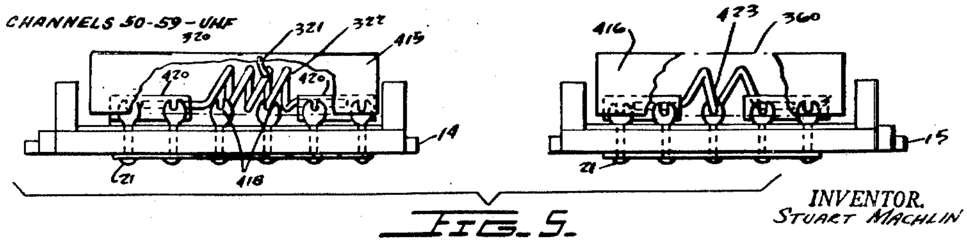

Figure 5 is a view of a pair of coils and the panels on which they are mounted in the U. H. F. turret and adapted to prepare the television input tuner to receive channels 50 to 59.

Figures 6, 7:
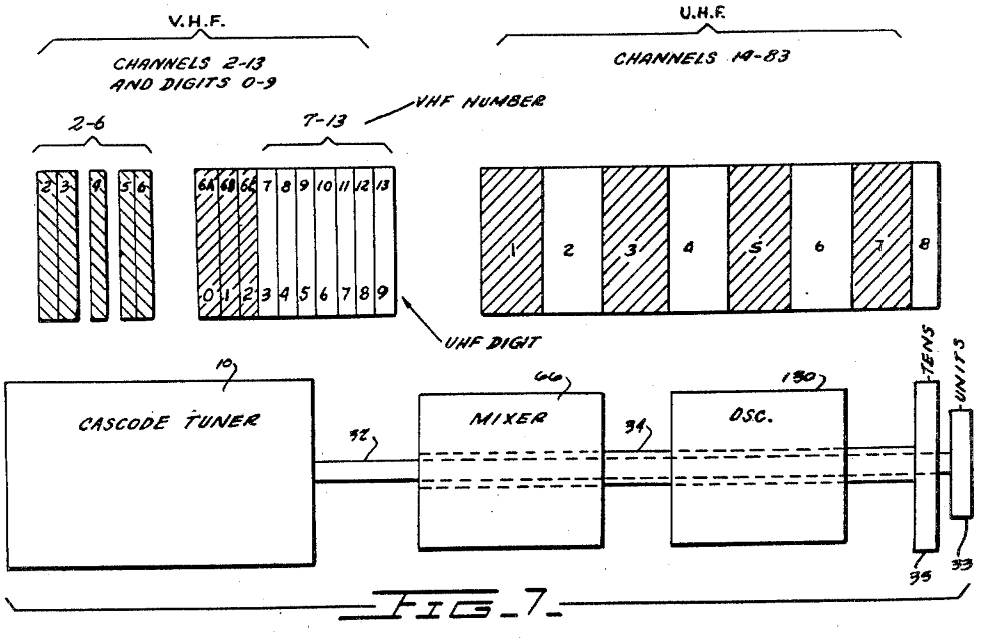

Figure 6 is a tabulation showing the relationship of the frequencies of the two turrets.

Figure 2:
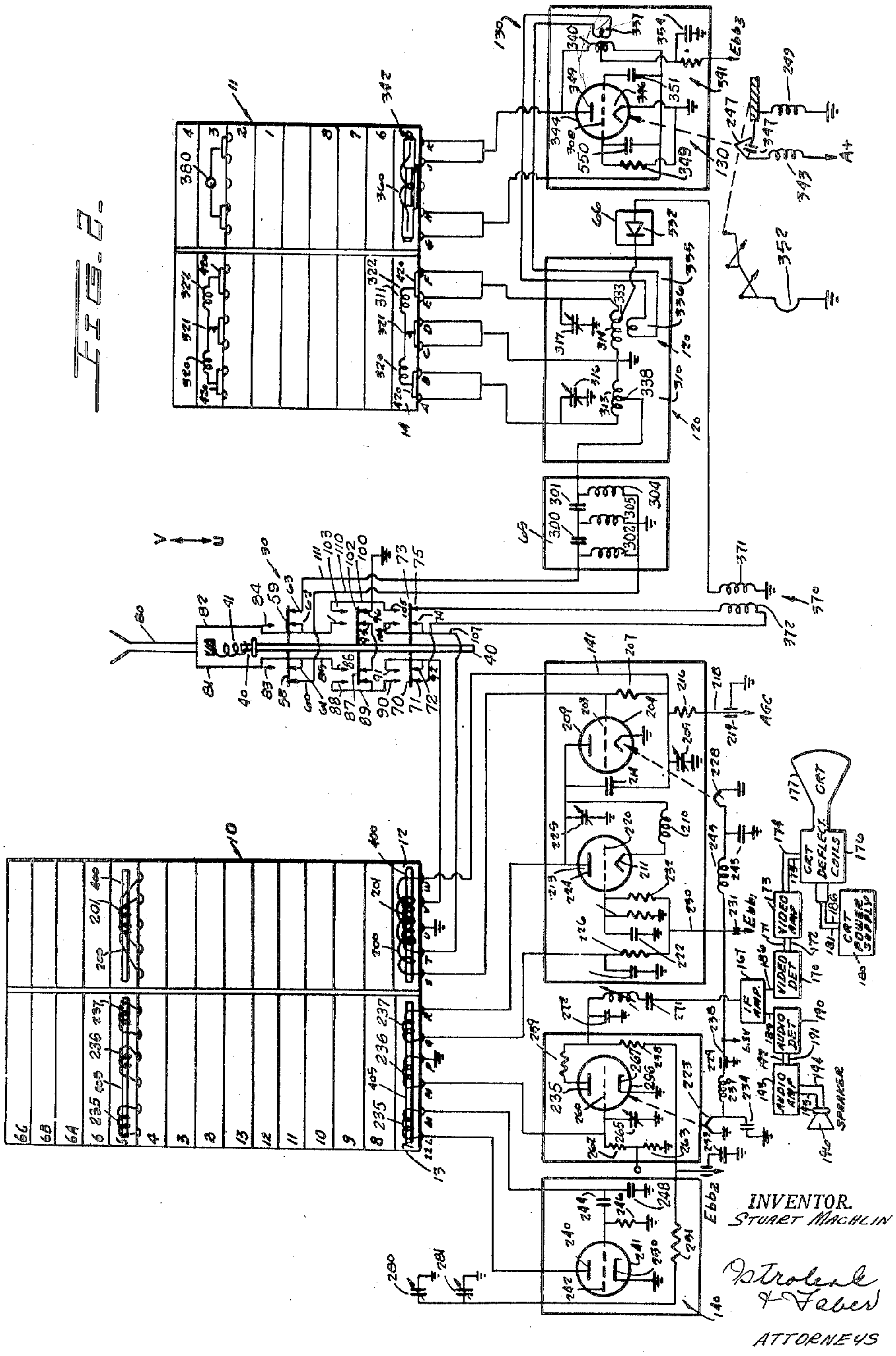
Figure 2 is a circuit diagram corresponding to Figure 1 but showing details of the system and showing how pairs of coils as in Figures 4 and 5 are combined to produce a selection of channel 53.

Figure 7 is a diagram which explains further together with Figure 2, the relationship between the two tuning systems.

Figures 1, 1A:
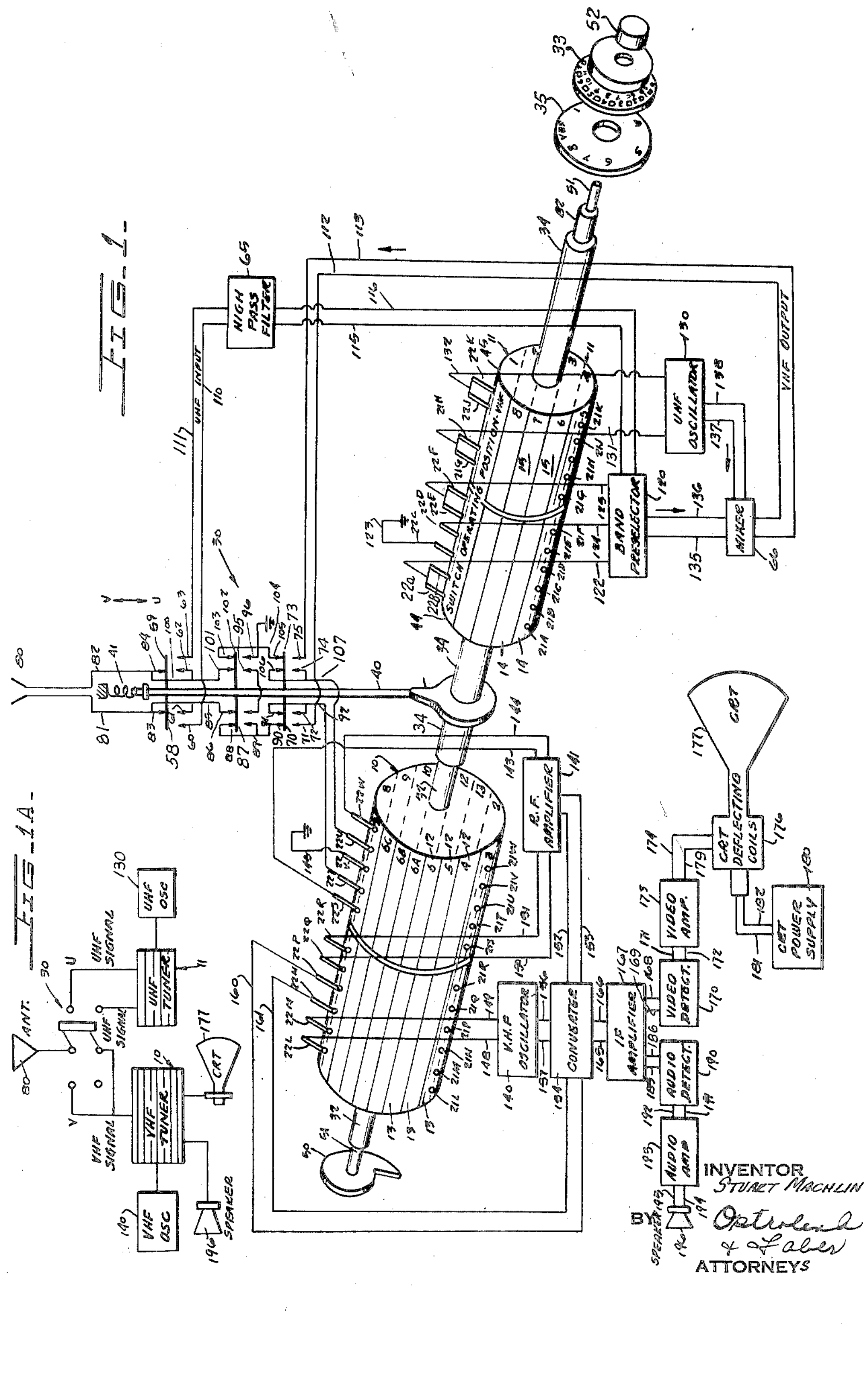
Figure 8:
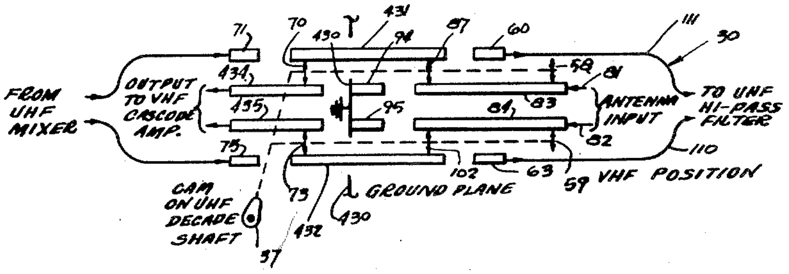

Figure 8 is a schematic view of the switch mechanism of Figures 1 and 2, the switch being set for V. H. F. reception.

Figure 9:
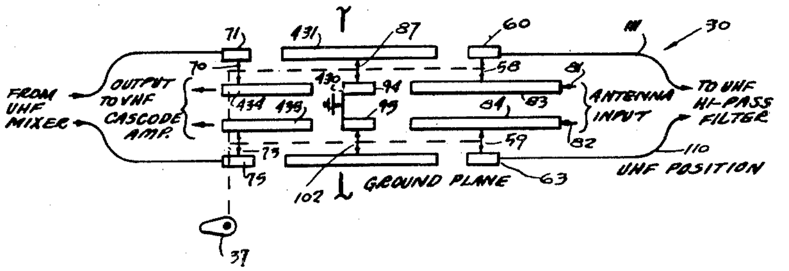

Figure 9 is a view corresponding to that of Figure 8 with the switch set for U. H. F. reception.

Figure 10:
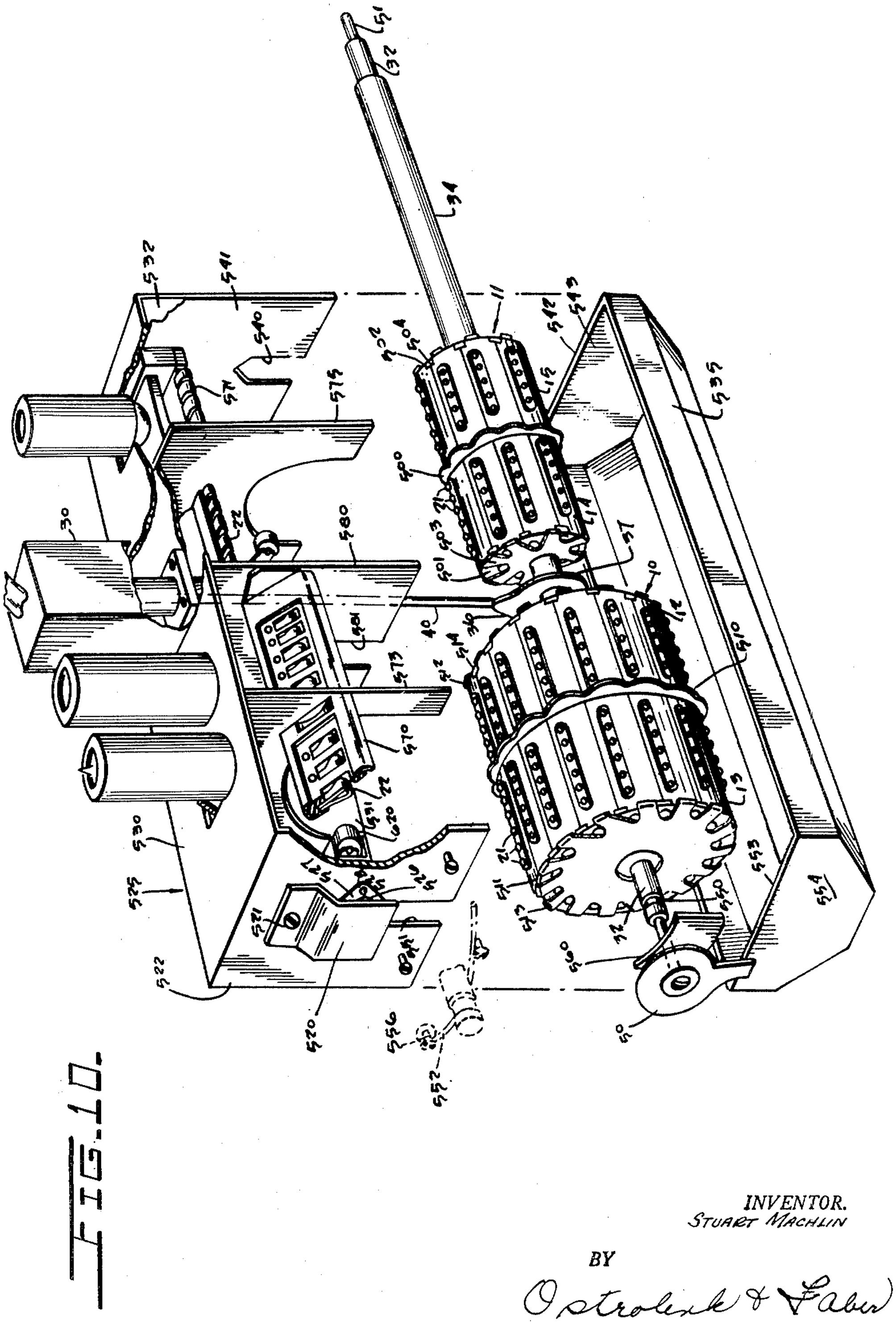

Figure 10 is an exploded view of the double turret arrangement in perspective.

Figures 11, 13:
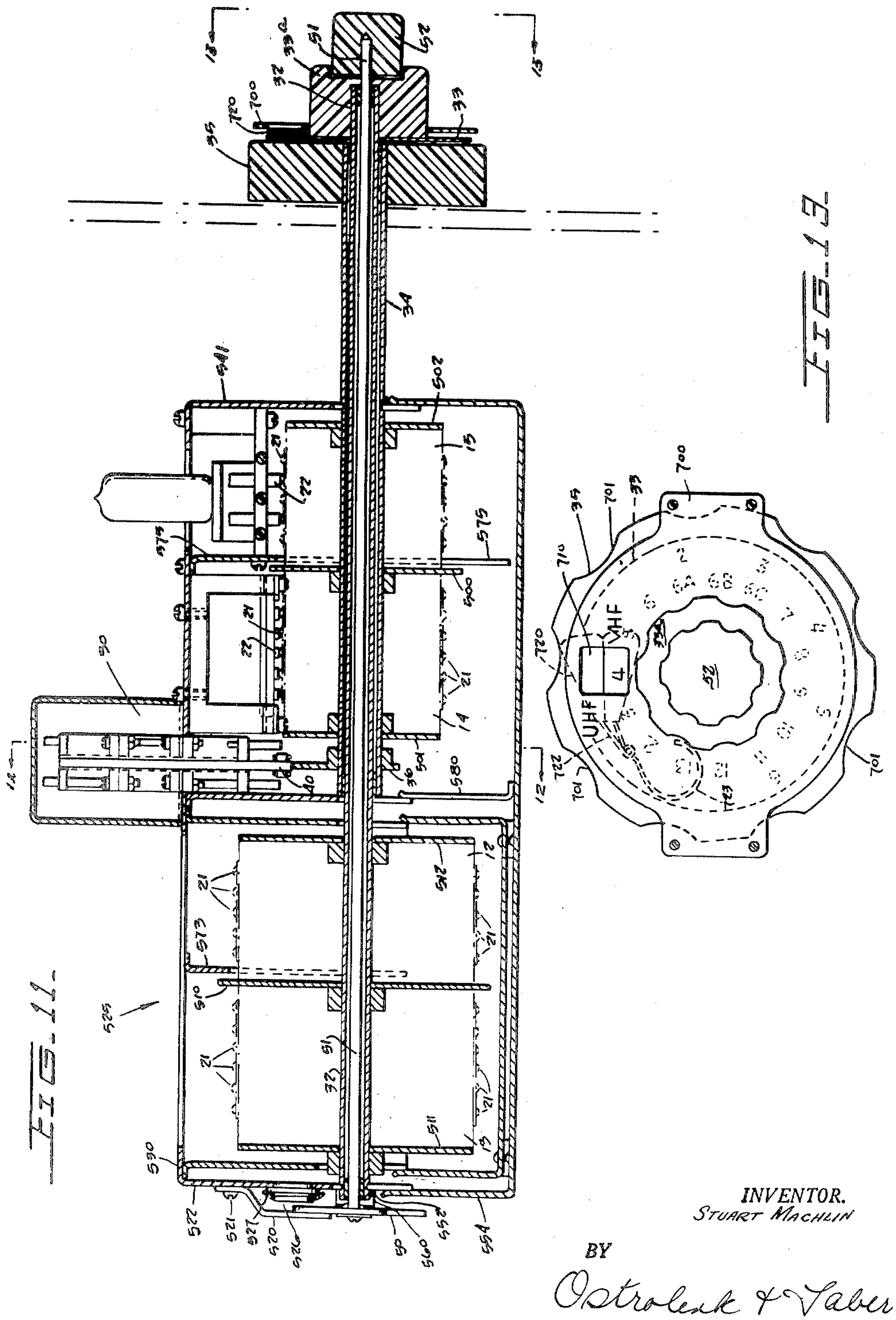

Figure 11 is a longitudinal cross-section through the tuner of Figure 10.

Figure 12:
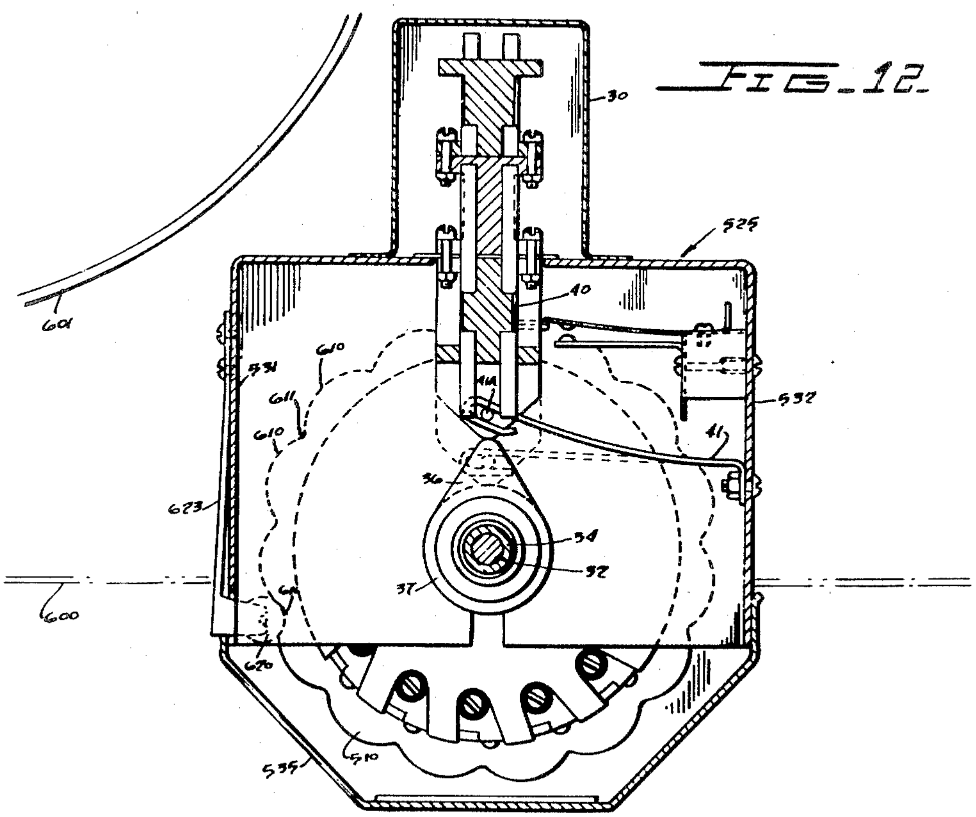

Figure 12 is a transverse cross-section through the tuner of Figure 10.

Figure 13 is a front elevation of the tuning knob arrangement of Figure 12.

Figures 14, 15, 16, 17, 18, 19, 20:
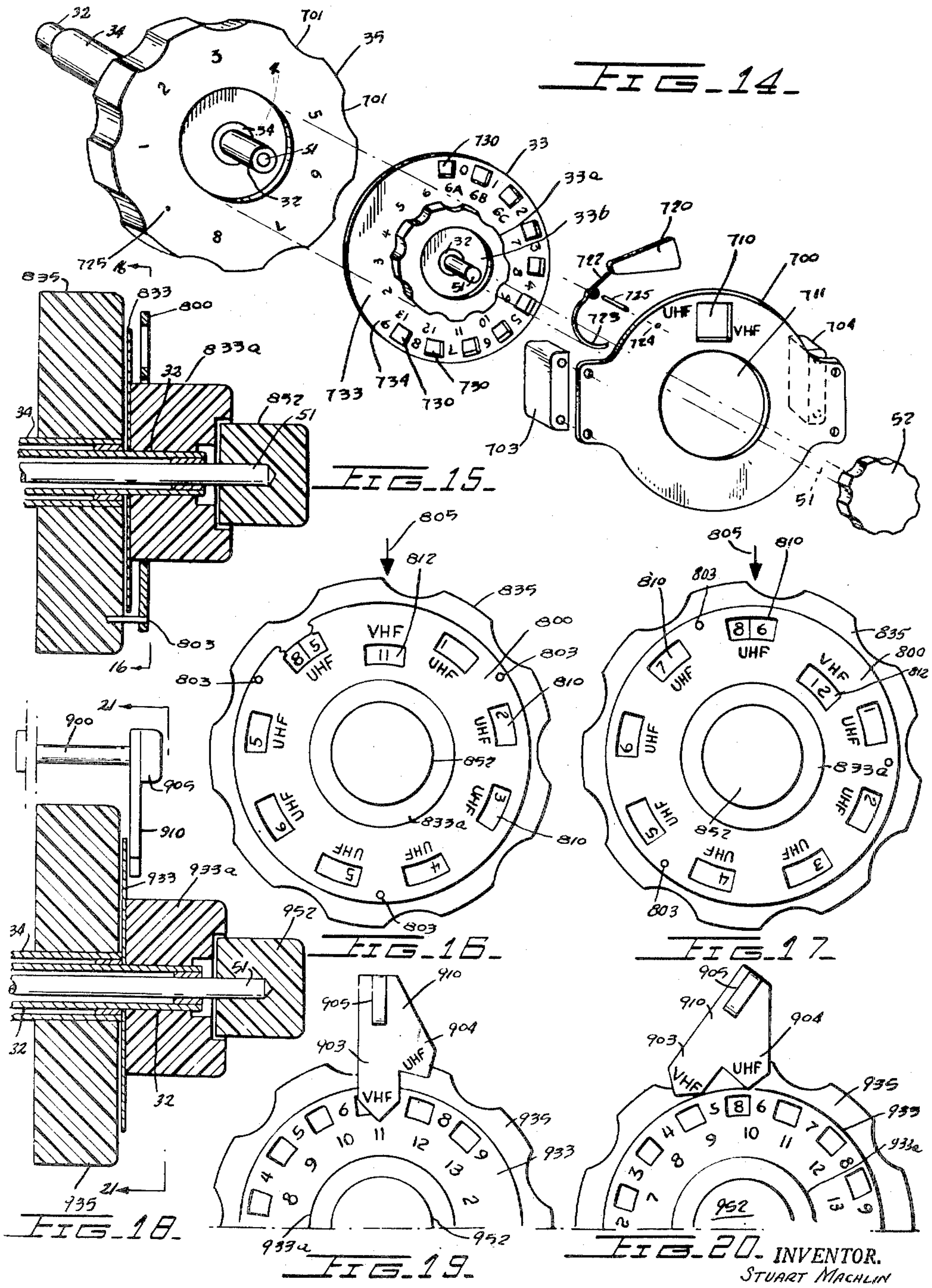

Figure 14 is an exploded view of the tuning knob arrangement of Figures 12 and 13.

Figure 15 is an enlarged cross-sectional view of a modified form of tuning knob assembly.

Figure 16 is a view taken from line 16—16 of Figure 15 looking in the direction of the arrows and showing the face of the knob as arranged for V. H. F. tuning.

Figure 17 is a view corresponding to that of Figure 16 showing the face of the knob as arranged for U. H. F. tuning.

Figure 18 is a cross-sectional view like that of Figure 15 showing another modified form of tuning control knob.

Figure 19 is a front view of the tuning knob taken from line 19—19 of Figure 18 showing the tuning knob arranged for V. H. F. reception.

Figure 20 is a front view of the same knob arranged for U. H. F. reception.

Figure 21:
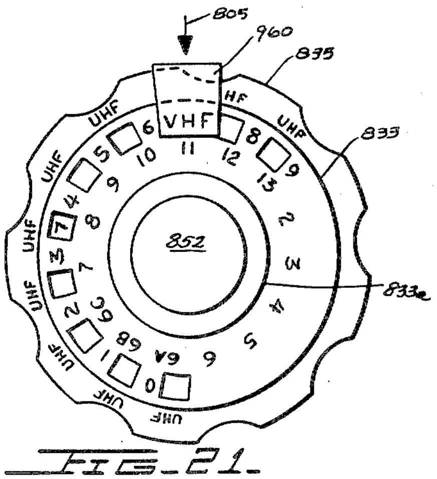

Figure 21 is a front view of another modified form of tuning knob assembly arranged for V. H. F. reception.

Figure 22:
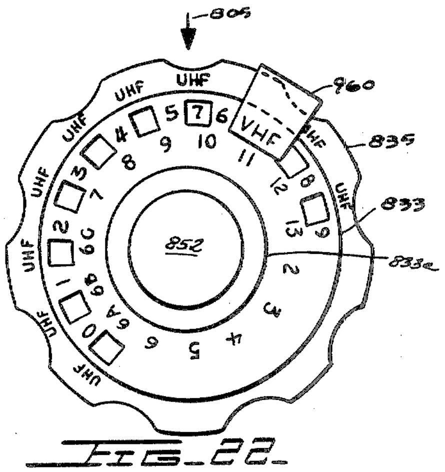
Figure 23:
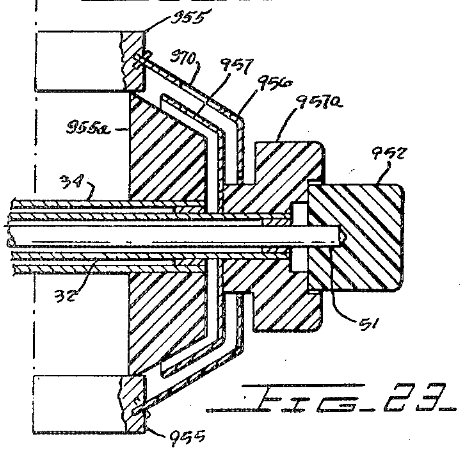

Figure 22 is a front view of another position of the tuning knob assembly of Figure 23.

Figure 23 is a cross-sectional view through a further modified form of tuning knob assembly.

Figure 24:
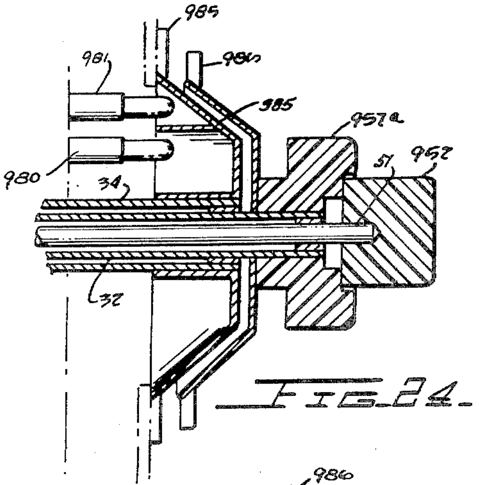

Figure 24 is a cross-sectional view through another modified form of tuning knob assembly utilizing a pair of lights for indicating the particular tuning system then being used, U. H. F. or V. H. F.

Figure 25:
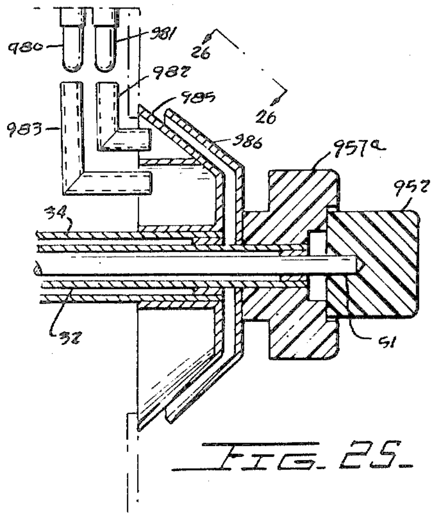

Figure 25 is a cross-sectional view showing still another modified form of tuning knob assembly.

Figure 26:
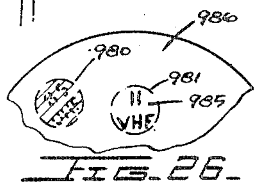

Figure 26 shows the tuning knob assembly of Figures 24 or 25 used to indicate a V. H. F. setting.

Figure 27:
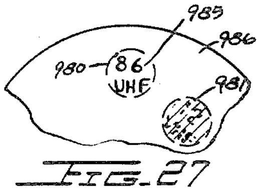

Figure 27 shows the same assembly used to indicate a U. H. F. setting.

Referring first to Figure 1, I have here shown my novel decade operating aligned double turret television V. H. F.-U. H. F. input tuner set for V. H. F. operation.

Certain other figures should, however, be referred to briefly solely for the purpose of conveying an idea of the appearance and function of the basic structure to aid in understanding Figure 1.

The actual conformation of the turrets 10, 11 is shown in Figure 13 and a preliminary inspection of Figure 10 will serve to show that each turret is individually rotatable and carries a plurality of panels 12, 13 for turret 10; and 14, 15 for turret 11. Each of these panels, as hereinafter described, carries tuning elements (examples of which are shown in Figures 2, 4 and 5) which may be utilized for channel selection. Each panel 12, 13, 14, 15 also has a plurality of contacts 21 adapted at a specific angular position of the turret 10 or 11 to engage stationary contacts 22 to establish predetermined circuits.

The switch 30 which effects the changeover from V. H. F. to U. H. F. and vice versa is seen in cross-section in Figure 12, and in operative schematic Figures 8 and 9 but is shown only in diagrammatic form in Figure 1.

Also, an examination of Figure 1*a* will show that the basic function of switch 30 is: (1) in the V position to transmit a V. H. F. signal from the antenna directly to the V. H. F. circuit elements while cutting out the U. H. F. elements; and (2) in the U position to transmit a U. H. F. signal from the antenna directly to the U. H. F. circuit elements from which after the signal has been converted into a V. H. F. signal which may match the frequency or frequencies to which the V. H. F. tuning elements may be tuned, it is transmitted directly to the V. H. F. circuit elements. A portion of the V. H. F. tuning elements is always used. The U. H. F. tuning elements on the other hand are connected between the antenna and the V. H. F. tuning elements only when a U. H. F. signal is to be received.

As shown in Figure 1*a*, with the switch 30 in the V position, incoming television signals are impressed upon the particular tuning panel illustrated. The V. H. F. turret here shown will, as is now well-known and illustrated in the above patent, select one of the twelve television channels depending upon the switching position to which the V. H. F. turret 10 has been moved.

If now it is desired to receive a U. H. F. television signal, the switch 30 is operated to the U position, so that a predetermined range of television frequency signals may be received as will be explained in the following.

The oscillator for any one panel on the U. H. F. turret will mix with a particular one of the incoming television signals to produce output signals corresponding to the frequency to which the elements on the panel of the V. H. F. turret now in circuit connection are tuned.

The same oscillator on the U. H. F. turret produces with nine other incoming television signals, frequencies which correspond to the tuned circuit of each of nine other panels on the V. H. F. turret. Thus, by maintaining the U. H. F. turret contacts in the position shown and switching the V. H. F. turret from panel to panel, the selection of ten different U. H. F. incoming signals can be made.

By switching the U. H. F. turret to the next panel, a further group of ten different U. H. F. frequency channels are now prepared for selection in the manner described above. That is to say, the second panel on the U. H. F. turret causes an oscillator to produce signals which mix with ten different U. H. F. incoming television signals to produce ten different V. H. F. signals, each of which corresponds to the frequency to which an individual one of the panels on the V. H. F. turret is tuned.

When, therefore, the V. H. F. turret is turned to a particular panel, the frequency resulting from the mixing of the oscillator on the U. H. F. turret with one of the incoming television signals will correspond to the frequency to which the particular V. H. F. panel is tuned. This then is repeated for each of a new group of ten incoming U. H. F. television signals.

With this preliminary explanation, the operation may now be understood from Figure 1.

In general, the turrets 10 and 11 are constructed along the lines and operate in the manner described in the above mentioned patent and will be structurally described later.

U. H. F. turret 11 of Figure 1 carries a plurality of pairs of panels 14 and 15. Panels 14 may now be referred to as T section panels; panels 15 as oscillator panels.

The construction and operation of the circuit elements on these panels will be described later. In the embodiment shown, each panel 14 has six contacts, 21*a*, 21*b*, 21*c*, 21*d*, 21*e*, 21*f*. Each panel 15 has four contacts 21*g*, 21*h*, 21*j*, 21*k*.

A pair of aligned panels 14 and 15 is used simultaneously. That is, when turret 11 is rotated to position where panel line "S" is under stationary contacts 22, the contacts 21*a* to 21*f* of panel 14 and contacts 21*g* to 21*k* of panel 15 for panel line "S" are in registry with the stationary contacts 22*a* to 22*f* and 22*g* to 22*k*, respectively.

Likewise, V. H. F. turret 11 carries a plurality of pairs of panels 12 and 13. Panels 13 may be referred to as oscillator converter segments and panels 12 as antenna segments. The construction and operation of the circuit elements on these panels will be described later. In the embodiment shown, each panel 13 has six contacts 21L, 21M, 21N, 21P, 21Q, 21R. Each panel 12 has five contacts 21S, 21T, 21U, 21V, 21W.

A pair of aligned panels 12 and 13 is used simultaneously. When turret 10 is rotated to a position where panel line "*6a*" is under stationary contacts 22, the contacts 21L to 21R of panel 13 on panel line "*6a*" engage stationary contacts 22L to 22R; and contacts 21S to 21W of panel 12 on panel line "*6a*" engage stationary contacts 22S to 22W.

V. H. F. turret 10 is mounted on rotatable shaft 32 which may be manually rotated by knob 33 secured to the shaft 32. U. H. F. turret 11 is mounted on concentric shaft 34 which may be rotated by knob 35 secured to shaft 34. The U. H. F. knob bears, at one point, the legend "VHF". This point coincides with the rise 36 of cam 37 secured to shaft 34 and with the dummy panels 44 and 45 on turret 11 which carry no contacts.

When the turret 11 is set at the angular position shown in Figure 1, rise 36 of cam 37 operates the operating rod 40 of switch 30 to the up or V position where the antenna is connected directly to the V. H. F. tuning elements and the U. H. F. tuning elements are cut out. At any other angular position of the U. H. F. turret 11, cam 37 permits spring 41 to drive the operating rod 40 of switch 30 down to the U position so that the movable contacts on operating rod 30 now open the antenna connection directly to the V. H. F. tuning elements and connect the antenna so that the signal passes through the U. H. F. tuning elements before it enters the V. H. F. tuning elements.

The dielectric member 50 of the fine tuner capacitor (hereinafter described) is mounted on shaft 51 which may be rotated by knob 52 secured thereto.

In the setting of the turret 11 shown in Figure 1, switch 30 has been operated to the V position for V. H. F. reception.

The U. H. F. elements have all been cut out by the removal of the contact bridge 58 from across contacts 60 and 61 and the removal of contact bridge 59 from across contacts 62 and 63. This cuts off the antenna input to the high pass filter 65 of the U. H. F. tuning elements and thereby cuts off any input signal to the U. H. F. tuning elements including turret 11. The output from the mixer of the U. H. F. tuning elements has been cut off by the removal of contact bridge 70 from across contacts 71 and 72 and the removal of contact bridge 73 from across contacts 74 and 75.

The U. H. F. tuning elements are thus isolated on the input and output sides. The circuit connections thereof will be described in connection with the U position of switch 30.

Now, in the V position of switch 30, the signal received by antenna 80 is conducted through leads 81 and 82 to contact 83 which is connected to lead 81 and to contact 84 which is connected to lead 82. Contact 83 is connected by lead 85 to contact 86.

Actually, as seen in Figures 8, 9 and 12, contacts 83, 61, 86 and lead 85 are preferably a single conductive metal strip, but they are here shown schematically in Figure 1 as separate units to clarify the explanation.

Signals from contact 86 then pass through bridging contact 87 to contact 88 and then through lead 89 to contact 90 (contacts 88, 93, 90 and lead 89 are also a single metal strip as seen in Figures 9, 10 and 14).

The signal energy then passes through bridging contact 70 to contact 91 and through lead 92 to stationary contact 22T for turret 10. (Again, contacts 91 and 72 and lead 92 are a single metal strip.)

Signal energy from lead 82 flow to contact 84 and then through lead 100 to contact 101 (contacts 84, 62, 101 and lead 100 may also be a single metal strip). Energy from the contact 101 flows through bridging contact 102 to contact 103 and then through lead 104 to contact 105 (contacts 103, 96, 105 and lead 104 may also be single metal strip). From contact 105, energy flows through bridging contact 73 to contact 106 and through lead 107 to stationary contact 22V for turret 10.

Thus, in the V position of the switch 30, antenna signal energy passes directly to stationary contacts 22T and 22V of turret 10 for the V. H. F. tuning elements. The U. H. F. tuning elements, including turret 11, are cut out at the input and output sides.

When the knob 35 is rotated to any position other than the V. H. F. position, shaft 34 and turret 11 are rotated and cam 37 carried by shaft 34 is also rotated out of the position shown in Figure 1. Therefore, in any of the positions "1" to "8" of the U. H. F. turret 11, the rise 36 of cam 37 is moved from under the operating rod 40 of switch 30 and spring 41 then drives the operating rod 40 of switch 30 to the U position.

This operation results in opening the direct connection from the antenna to stationary contacts 22V and 22T of the V. H. F. turret 10 and connecting the antenna leads 81 and 82 directly to the high pass filter 65 for the U. H. F. circuit including the U. H. F. turret 11. At the same time, the output leads of the U. H. F. circuit to contacts 71 and 72 of the switch 30 are then connected to the stationary contacts 22T and 22V of the V. H. F. turret 10.

By this switching operation, the antenna which has previously been connected in the position of Figure 1 directly to the V. H. F. turret 10 is now connected directly to the U. H. F. elements and the energy from the antenna leads 81 and 82 must pass through and be operated on by the U. H. F. elements before it reaches the V. H. F. circuits.

In the U position of switch 30, lead 81 from antenna 80 is connected through lead 85 to contact 61. Contact 61 is connected by bridging contact 58 to contact 60 which is then connected by lead 110 to the high pass filter 65. Similarly, lead 82 of the antenna is connected by lead 100 to contact 62 of the switch 30. When the switch is in the U position, the contact 62 is connected by bridging contact 59 to lead 111 of the high pass filter 65. Leads 110 and 111 and their associated contacts 60 and 63, therefore, constitute the input leads for the entire U. H. F. system including turret 11.

The output leads 112 and 113 of the U. H. F. system are connected to contacts 71 and 75 of the switch. In the V position of the switch, contact 71 is connected by the bridging contact 70 to contact 72 which is then connected by lead 92 to stationary contact 22T for turret 10. Similarly, in the same position of the switch, contact 75 is connected by bridging contact 73 to contact 74 which is connected by lead 107 to stationary contact 22V of the turret 10.

The essential function of the U. H. F. elements including turret 11 is to convert the U. H. F. signal received by the antenna 80 into a signal which may be usable by the V. H. F. elements. The function of the U. H. F. elements, therefore, is essentially to convert the U. H. F. signal into a V. H. F. signal so that at stationary contacts 22T and 22V the same signal frequency will be present as would have been present had a V. H. F. signal from the antenna 80 been transmitted to these contacts directly in the V shaped position of the switch 30.

Figure 3:
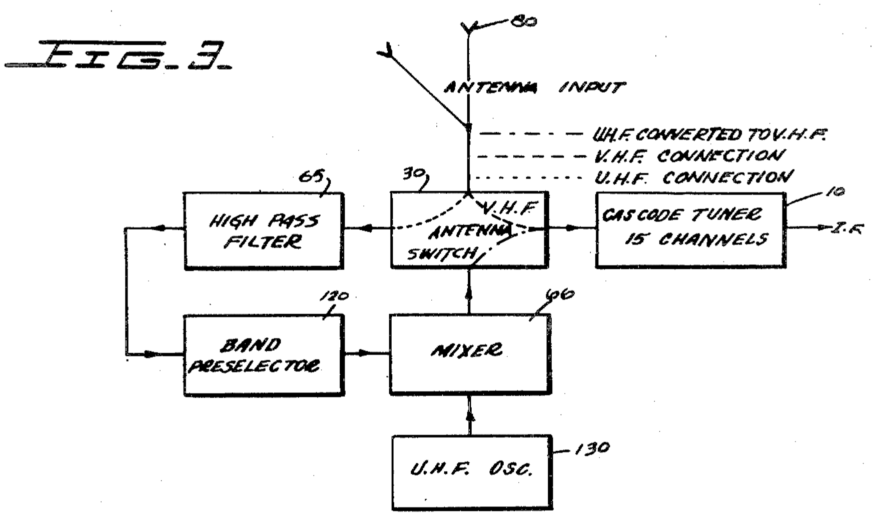
Figure 3 is a block diagram showing the relationship of the major circuit elements of Figure 1 to each other.

The specific electrical circuits for the U. H. F. system as well as for the V. H. F. system are described in connection with Figure 2. Figure 3 also shows in simplified block diagram form, the electrical operations indicated in Figure 1 and shown specifically in Figure 2.

The specific operation of each of the major elements such as the high pass filter shown in Figure 1 will, therefore, be described in detail with respect to Figure 2.

However, continuing with Figure 1, the basic operation may be understood by temporarily treating each complex of circuit elements in both the U. H. F. and V. H. F. sections as a single unit.

Therefore, output energy from the high pass filter 65 is transmitted by leads 115, 116 to the band selector 120. The band selector 120 depends for its operation on the turret 11 or rather on panels 14 of the turret 11. That is, for each group of U. H. F. frequencies (in the particular embodiment shown, each group of U. H. F. frequencies will constitute ten separate channels) the tuning coils in the band selector must be changed.

The panels 14 constitute a plurality of separate impedance network, eight in the present instance, which may be switched into and out of circuit with other band selector elements as different groups of U. H. F. frequencies are to be selected. This operation, as above pointed out, is performed by rotation of knob 35 which rotates shaft 34 and turret 11. The particular coils of turret 11 selected for the particular group of frequencies are determined by the particular panel 14 which underlies the stationary contacts 22a to 22f so that the contacts of that particular panel may engage the stationary contacts.

Therefore, when panels along line "8" are turned by operation of knob 35, shaft 34 and turret 11 so that they underlie stationary contacts 22, 22, the coil on panel 14 for that particular line "8" is connected by the contacts 21a to 21f for that panel, making an appropriate current carrying engagement with the stationary contacts 22a to 22f. The particular arrangement of the coils will be better seen in Figures 2, 4 and 5.

Stationary contacts 22a and 22b are bridged to the single lead 122 which is connected to the band selector. Contact 22c is connected by lead 123 to ground. Contact 22d is connected by lead 124 to the band selector. Contacts 22e and 22f are bridged to lead 125 which is connected to the band selector.

The three leads 122, 124 and 125 of the band selector thereby make it possible, owing to the operation of turret 11, to switch different coils on panel 14 into circuit with the band preselector. Consequently, the coils on panels 14 of turret 11 may simply be regarded as part of the band preselector 120 with the turret providing for a simplified means for switching different coils into the band preselector circuit when different groups of frequencies are to be received.

An independent U. H. F. oscillator 130 is provided in the U. H. F. system, the purpose of which will be more fully understood from an examination of Figure 2 but which may be regarded generally for the present as generating a local frequency which may be mixed with the U. H. F. received frequency to have the ultimate result of reducing the U. H. F. frequency to a V. H. F. frequency which may thereafter be properly handled by the V. H. F. tuning elements.

For this purpose, however, it is essential that for each frequency band selected by the band preselector 120, U. H. F. oscillator 130 should be controlled so that an appropriate mixing may be obtained with the received U. H. F. signal. This is accomplished by the plurality of coils on panels 15 of the U. H. F. turret 11. The contacts 21g to 21k on the panels carrying these coils are arranged so that for each position of turret 11 a different oscillator coil is connected to the stationary contacts 22g to 22k.

The left half of turret 11 may, therefore, be regarded as a part of the band preselector circuit, while the right half of turret 11 carrying panels 15 may be regarded as a part of the U. H. F. oscillator. Stationary contacts 22g and 22h are bridged to lead 131 which is connected to the U. H. F. oscillator. Stationary contacts 22j and 22k are bridged to lead 132 which is also connected to the U. H. F. oscillator 130.

By this means, therefore, rotation of turret 11 by knob 35 results in the simultaneous connection to the band preselector circuit 120 and the U. H. F. oscillator circuit 130 of different coils appropriate to each other and appropriate to the particular group of U. H. F. frequencies which are to be received and thereafter transmitted as a V. H. F. signal to the V. H. F. operating elements for further selection, detection and amplification into the desired audio and video signal for the particular U. H. F. channel desired.

The U. H. F. oscillator circuit 130 is connected by leads 137 and 138 to another input of the band preselector 120. The band preselector 120 is connected by leads 135 and 136 to the input of the mixer circuit 66. The output signal which has been thereby changed from a U. H. F. input to an output which may be utilized by the V. H. F. circuits is now transmitted by leads 112 and 113 as above mentioned to contacts 71 and 75 of the switch 30 from which they are transmitted as above described to the stationary antenna input contacts 22T and 22V of the V. H. F. circuit.

Turning now to the specific V. H. F. circuit, it should be understood that the panels 13 cooperate with the V. H. F. oscillator 140 in the same manner as the panels 15 cooperate with the U. H. F. oscillator 130 previously described.

Likewise the panels 12 of the V. H. F. turret 10 cooperate with the R. F. amplifier 141 in the same manner as the panels 14 cooperate with the band selector 120. There is a difference, however, in that certain of the leads from panels 13 of the V. H. F. turret 10 are to be connected to the R. F. amplifier.

As the turret 10 is rotated by knob 33 to select either individual V. H. F. frequencies received at antenna 80 or to select specific V. H. F. frequencies within the band of U. H. F. (converted into V. H. F.) signals received from leads 112 and 113 and contacts 71 and 75 of the U. H. F. system, the different coils on the different panels 12 and 13 are moved so that the contacts 21S to 21W of individual panels 12 and the contacts 21L to 21R of individual panels 13 may be moved into engagement with the corresponding similarly lettered stationary contacts 22.

The signal energy input as above pointed out is at stationary contacts 22T and 22V which engage similar contacts 21T and 21V on the particular panel 12 which is brought to rest in registry with the stationary contacts. Stationary contacts 22S and 22V are connected by leads 143 and 144 to an input of the R. F. amplifier 141. Stationary contact 21U is connected by lead 145 to ground.

The contacts 21L and 21M on the particular panel which is in registry with the stationary contacts 22 are connected by stationary contacts 22L and 22M and their respective leads 148 and 149 to the V. H. F. oscillator circuit 140.

Similarly, the contacts 21P, 21Q and 21R and the leads 150 and 151 are connected to another input of the R. F. amplifier circuit 141. The output of the R. F. amplifier 141 is connected by leads 152 and 153 to an input of the conveyor circuit 154. The output of the V. H. F. oscillator 140 is connected by leads 156 and 157 to another input of the converter circuit 154. The converter circuit 154, however, requires that for each V. H. F. frequency which is to be received by the V. H. F. circuit a different coil be utilized in the converter circuit 154.

Consequently, the coils on panels 13 are so arranged that as turret 10 is rotated to successive positions, a different coil is switched into the converter circuit at each successive position. This coil on each panel 13 is connected to contacts 21N and 21P connected to the stationary contacts 22N and 22P which are connected by leads 160 and 161 to the converter circuit 154 so that the converter circuit may also be appropriately tuned to the desired V. H. F. frequency to co-operate properly with the V. H. F. oscillator circuit 140 and the R. F. amplifier circuit 141.

The output of the converter circuit is now used in the well-known way to produce appropriate video and audio signals. As indicated schematically in Figure 1, the output of the converter circuit 154 is connected by leads 165 and 166 to the I. F. amplifier 167. The I. F. amplifier is connected by leads 168 and 169 to the video detector circuit 170. The video detector circuit 170 is connected by leads 171 and 172 to the video amplifier circuit 173. Video amplifier circuit 173 is connected by leads 174 and 175 to the deflecting coil assembly 176 of the cathode ray tube 177.

Any appropriate power supply 180 may be used for all of the circuit elements thus far described; in particular the power supply 180 is shown connected by leads 181 and 182 to the cathode ray tube 177 as the power supply therefor.

The output of I. F. amplifier 167 is also connected by leads 185 and 186 to the audio detector circuit 190 which in turn is connected by leads 191, 192 to the audio amplifier circuit 193. The audio amplifier circuit 193 is connected by leads 194, 195 to the speaker 196.

The system may now be understood. The specific circuit arrangements and the specific structural arrangements are themselves novel and important; but they are all subservient to and carry out the system of Figure 1.

Referring, in fact to Figure 1 and assuming first that a V. H. F. channel is desired, the U. H. F. knob 35 is turned to the position shown in Figure 1 so that switch operating cam 37 which rotates with sleeve 34 operated by knob 35 and carrying also U. H. F. turret 11 moves rod 40 of switch 30 so that the contacts of switch 30 are positioned as shown in Figure 1.

As previously mentioned, the function of switch 30 is twofold. In fact, switch 30 serves not only to connect the antennas into the V. H. F. section or the U. H. F. section of the tuner, depending on what band is desired, but serves also to connect the output of the U. H. F. section of the tuner into the input of the V. H. F. section of the tuner.

Antenna system 80 actually comprises two antennas, a U. H. F. antenna and a V. H. F. antenna. In fact, it is well-known in the art that the physical structure of the antennas is a definite function of the wave length or frequency at which the antenna is supposed to operate and since the V. H. F. band covers approximately 150 megacycles the highest frequency being 216 megacycles, while the U. H. F. frequency band covers approximately 450 megacycles with the lowest frequency being 470 megacycles, there is a great separation between the V. H. F. band and the U. H. F. band and, therefore, considerable difference in the wave length of the V. H. F. signals and the U. H. F. signals.

While antenna system 80 must comprise two antennas, with my present system only one set of leads needs to be brought into the television set from the antenna system 80. In fact, when as previously mentioned the U. H. F. knob 35 is positioned as shown in Figure 1, the contacts of switch 30 are moved to take the position shown so that the antenna system 80 is connected through switch 30 into the V. H. F. tuner 10.

If now the V. H. F. knob 33 is turned to the desired V. H. F. channel, the signals from antenna system 80 will be introduced into the correct panel 12 of V. H. F. turret 10. In panel 12 an electrical circuit will select the signals having frequencies lying in the V. H. F. band corresponding to the channel selected. For example, if channel 7 is desired, then the electrical circuit in panel 12 of turret 10 will select and pass to the radio frequency amplifier 141 all signals having frequencies between 174 and 180 megacycles and reject or discriminate against all the other frequencies of the V. H. F. or U. H. F. bands. This selection is continued through the radio frequency amplifier 141 with the result that the amplifier V. H. F. signals introduced into the converter 154 lie practically all in the correct frequency band corresponding to the desired channel, for the above example 174 to 180 megacycles.

When knob 33 of the V. H. F. turret 10 is turned to the desired channel, the correct V. H. F. panel 13 will be connected across the V. H. F. oscillator 140 so that V. H. F. oscillator 140 may oscillate at a preselected frequency. The oscillator signals are fed to converter 154 and there mixed with the above-mentioned signals from the radio frequency amplifier.

As a result of the mixing occurring at converter 154 between the V. H. F. oscillator signals and the U. H. F. signals from the radio frequency amplifier 141, the modulated signals arriving at intermediate frequency amplifier 167 will have a new carrier frequency which may have any desired range such as from 20 to 25 megacycles or approximately from 40 to 45 megacycles depending on the preselected values at which the intermediate frequency amplifiers 167 are tuned.

If fine tuning should be desired at this point, by rotation of knob 52 dielectric 50 of the fine tuning capacitor hereinafter described will be moved to change the capacitance of this capacitor and, therefore, provide the required fine tuning.

To summarize the above, in order to receive a V. H. F. channel with my novel tuner, it is necessary: (1) to turn the U. H. F. knob 35 to the V. H. F. position, (2) to rotate the V. H. F. knob 33 to the desired V. H. F. channel and (3) only when necessary, to rotate fine tuning knob 52 until the desired quality of image is obtained in the screen of cathode ray tube 177.

As is now evident from the above, in order to receive a V. H. F. channel, only one additional operation than that previously required need be performed; to wit., rotation of U. H. F. knob 35 to its V. H. F. position.

When, on the other hand, a U. H. F. channel is desired, for example, channel 44, the U. H. F. knob 35 is turned so that turret 11 brings the correct panels 14 and 15 in contact with the U. H. F. band preselector 120 and the U. H. F. oscillator 130.

Since cam 37 is mounted on sleeve 34 carrying turret 11, on rotation of turret 11, cam 37 will also rotate, permitting rod 40 of switch 30 to go to its U position. When switch 30 is in the U position, then antenna system 80 is connected through contacts of switch 30 to the high pass filter 65. High pass filter 65 serves to discriminate between the V. H. F. signals and the U. H. F. signals, and it will be needed whenever the U. H. F. antenna or antenna system 80 is so positioned that it picks up not only U. H. F. signals but also V. H. F. signals. High pass filter 65 will have to attenuate to substantially reject all the V. H. F. signals and pass with the least possible attenuation all the U. H. F. signals from approximately 470 megacycles to 900 megacycles.

It is, therefore, seen that the output of high pass filter 65 will substantially attenuate all but the U. H. F. signals. All the U. H. F. signals picked up by antenna system 80, therefore, pass through attenuation all the U. H. F. signals from approximately 470 megacycles to 900 megacycles.

It is, therefore, seen that the output of high pass filter 65 will contain only U. H. F. signals. All the U. H. F. signals picked up by antenna system 80, therefore, pass through high pass filter 65 and go into the band preselector 120 and if, as previously mentioned, U. H. F. knob 35 is turned to position 4, then the electrical circuit mounted on panel 14 corresponding to position 4 of U. H. F. knob 35 will be connected across band preselector 120 so that band preselector 120 becomes a complete band pass filter to pass signals having frequencies lying in the U. H. F. band corresponding to position 4 of U. H. F. knob 35 which in this case corresponds to the U. H. F. band from 566 megacycles to 626 megacycles.

In other words, band preselector 120 when the correct panel 14 is connected across one set of its terminals will pass all the frequencies between 566 and 626 megacycles in the present example and will reject all the other U. H. F. frequencies which are present in the output of the high pass filter 65.

At this desired position of U. H. F. knob 35, an electrical circuit mounted on the corresponding panel 15 of turret 11 is connected across U. H. F. oscillator 130 so that U. H. F. oscillator 130 will oscillate at a certain preselected desired U. H. F. frequency, in the present example 410 megacycles.

The signals from U. H. F. oscillator 130 and band preselector 120 are mixed in U. H. F. mixer 66 producing now for the present example 10 V. H. F. signals in the frequency range 156 to 216 megacycles. All these V. H. F. signals are introduced again through switch 30 in its U position to the input of V. H. F. turret 10.

As seen in the drawings, the antenna leads and leads to the V. H. F. panels when disconnected act as a capacitor. However, grounding the antenna leads eliminates this capacitance which would otherwise feed signal energy of V. H. F. to the tuner.

In other words, it is necessary to substantially eliminate all possible sources for picking up V. H. F. incoming signals of the frequency to which the U. H. F. is to be converted to prevent reception of the V. H. F. on the air at the time.

At this desired position of U. H. F. knob 35, an electrical circuit mounted on the corresponding panel 15 of turret 11 is connected across U. H. F. oscillator 130 so that U. H. F. oscillator 130 will oscillate at a certain preselected desired U. H. F. frequency, in the present example 410 megacycles.

The signals from U. H. F. oscillator 130 and band preselector 120 are mixed in U. H. F. mixer 66 producing now for the present example 10 V. H. F. signals in the frequency range 156 to 216 megacycles. All these V. H. F. signals are introduced again through switch 30 in its U position to the input of V. H. F. turret 10.

At this point it will be necessary to turn V. H. F. knob 33 to a position such that together with U. H. F. knob 35, the preselected U. H. F. channel is received and if in the present example 44 is the required channel, V. H. F. knob 33 will have to be turned until the digit 4 is combined in its correct position with decade 4 of U. H. F. knob 35 to form number 44 which is the desired U. H. F. channel.

When, therefore, V. H. F. knob 33 is turned to receive channel 44, turret 10 rotates until the correct set of panels 12 and 13 are connected across radio frequency amplifier 141, V. H. F. oscillator 140 and converter 154 so that radio frequency amplifier 141 together with its corresponding panel 12 passes all signals having frequencies between 180 and 186 megacycles in the present example and attenuate to substantially reject all other V. H. F. signals coming from U. H. F. mixer 66.

At the same time, V. H. F. oscillator 140 with the corresponding panel 130 connected across it will oscillate and produce signals which when mixed in converter 154 with signals coming from radio frequency amplifier 141 have a carrier frequency corresponding to the intermediate frequency to which intermediate frequency amplifiers 167 are tuned.

To summarize the U. H. F. operation, it is thus seen that in order to receive a U. H. F. channel it will be necessary: (1) to turn the U. H. F. knob 35 to the band width in which the desired U. H. F. channel is located, (2) to turn V. H. F. knob 33 until together with U. H. F. knob 35 the desired U. H. F. channel number is obtained, and (3) fine tuning knob 52 may be operated to obtain on the screen of tube 177 the desired quality of image.

As seen from the above, when a U. H. F. channel is desired, only rotation of U. H. F. knob 35 and V. H. F. knob 33 is necessary to obtain the correct U. H. F. channel. This obviously is a great simplification and a great advantage over some of the existing U. H. F. converters which being separate from the television chassis itself and having, therefore, separate power supplies and separate switching means require when it is desired to go from V. H. F. to U. H. F. reception first a considerable heating period so that such a U. H. F. converter may reach its operating conditions. After this first operation, the U. H. F. channel will have to be obtained by rotation of knobs similar to the operation described above.

Furthermore, while present day U. H. F. tuners need actually two completely separate circuits for U. H. F. and for V. H. F. channels, both circuits ending in the intermediate frequency amplifier of the television set itself, which in Figure 1 of this description is referred to as 167, this novel tuner as above described uses the V. H. F. circuit not only for reception of V. H. F. signals directly from antenna system 80 but also for reception of V. H. F. signals from the U. H. F. section 11 of this novel tuner.

In other words, when turning from V. H. F. to U. H. F. channels, only one conversion is here used; a signal coming from antenna system 80 is first converted to a V. H. F. signal in the U. H. F. section of this novel tuner and this V. H. F. signal is then converted for the second time into a signal having the carrier frequency to which the intermediate frequency amplifiers 167 are tuned.

It is further seen that by the addition of a new turret 11 having nine positions to the pre-existing V. H. F. turret 10 in which though three more sets of panels 12—13 have been added, it is possible to receive not only the original twelve V. H. F. channels (2 to 13) but also seventy more U. H. F. channels.

The great versatility of this novel tuner will be further appreciated if one considers that quite a few thousand U. H. F. stations will be allocated by the F. C. C. in the United States, and all these U. H. F. stations will be in the frequency range 470 megacycles to 890 megacycles.

In other words, this novel tuner once applied to a television set permits the use of a television set in any location in the United States regardless of the particular U. H. F. or V. H. F. channels allocated to that particular location since this novel tuner can receive all the V. H. F. channels and all the U. H. F. channels contemplated by the F. C. C.

Referring now to Figure 3 showing a block diagram of this novel tuner, it is there seen that when a V. H. F. channel is desired, the antenna system 80 is connected through switch 30 to the cascode tuner 10, the connection being shown by the dash line in Figure 3 and from cascode tuner 10, the signal now converted to the intermediate frequency of the television set is sent to the television chassis itself.

When, on the other hand, a U. H. F. channel is desired, the antenna system 80 is connected to high pass filter 65 through switch 30, the connection being shown schematically by the dotted line.

High pass filter 65 discriminates against any V. H. F. signal and sends U. H. F. signals to the band preselector 120 which, in turn, attenuates all U. H. F. frequencies except those lying in a preselected band and sends these selected frequencies into the U. H. F. mixer 66 so that at the output of mixer 66 there would be a V. H. F. signal which is the result of this first conversion which occurs in mixer 66.

This converted V. H. F. signal is now connected again through switch 30 into the cascode tuner 10, the connection being shown in dash dotted line. From the cascode tuner 10, as for the reception of V. H. F. channels, the desired signal is introduced into the intermediate frequency amplifiers of the television set with a carrier frequency equal to the frequency to which the intermediate frequency amplifiers are tuned.

Referring next to the detailed electrical circuit of this novel tuner shown in Figure 2, it will be first assumed that switch 30 is in the V position so that its contacts are positioned as shown in Figure 1. Under these conditions as can be seen from Figure 1 and as is described in connection with Figure 1, the input signals from antenna system 80 are transmitted to stationary contacts 22T and 22V which are now in contact with contacts 21T and 21V of the described panel 12 of turret 10.

Each of the panels 12 of turret 10 carry as shown in Figure 2 and more in detail in Figures 4 and 5 two coils 200 and 201. Coils 200 and 201 are mounted on panels 12 so that only contacts 21 of each panel 12 can be seen from the outside of turret 10. One coil 201 is connected to contacts 21T and 21V. The other coil 200 is connected across contacts 21S and 21W. The center point of coil 201 is connected to contact 21U. When the movable contacts 21 come into engagement with stationary contact 22 and when the antenna switch 30 as previously mentioned is in the V position, then antenna system 80 is connected across coil 201 through the respective engagement of contacts 22T with 21T and 22V with 21V.

At this position, contact 21U is connected to contact 22U which, in its turn, is grounded to the chassis of this novel tuner. When turret 10 is in this position, coil 200 will be connected across grid 203 of radio frequency amplifier 204 and ground through variable capacitance 205. Since coils 200 and 201 are wound, one around the other, they form a transformer in which coil 201 is a primary and 200 is a secondary.

When switch 30 is in the V position, primary 201 center tapped and grounded is connected to the antenna system 80 while coil 200 is connected across the input of radio frequency amplifier 204. Therefore, there will appear across resistance 207 connected between grid 203 of tube 204 and capacitance 205, an amplified V. H. F. signal if the transformer 200—201 is a step up transformer.

The plate 209 of radio frequency amplifier tube 204 is connected through an inductance 210 to the cathode 211 of the second radio frequency amplifier tube 213. Plate 209 is also connected through capacitance 214 and resistance 216 to the automatic gain control circuit in the drawing referred to as A. G. C., the connection to the A. G. C. being done through lead 218 grounded by capacitance 219.

The V. H. F. amplified signal from plate 209 is therefore fed to the cathode 211 of the second radio frequency amplifier 213. The grid 220 of tube 213 is grounded through resistance 221, capacitance 222 so that the radio frequency stage consisting of the radio frequency amplifiers 204 and 213 forms cascode amplifier of the type shown in application Serial No. 211,959, filed February 20, 1951.

Plate 224 of RF tube 213 is connected to stationary contact 22R and is provided with a grounding variable capacitance 225. Stationary contact 22Q is connected to resistance 226 by passed to ground by capacitance 227. Resistance 226, in its turn, is connected to power supplies $E_{bb1}$, the connecting lead 230 having a grounding capacitor 231. To the same power supply $E_{bb1}$, through the same conductor 230, is connected grid resistance 232 which is connected to grid 220 of second RF tube 230.

As previously mentioned aligned with panel 12 of turret 10 is a panel 13 previously referred to also as the oscillator converter segment.

On the oscillator converter panel 13 is mounted a system of coils consisting of oscillator coil 235, converter coil 236 and radio frequency amplifier coil 237. Coil 235 is connected to the outwardly extending contacts 21L and 21M; converter coil 236 is connected to similar contacts 21N and 21P and radio frequency amplifier coil 237 is connected between contacts 21Q and 21R.

When turret 10 is at the desired V. H. F. channel and, of course, switch 30 is in the V position, movable contacts 21L, M, N, P, Q, R engage their respective stationary contacts 22L, M, N, P, Q, R and as it was previously described plate 224 of radio frequency amplifier tube 13 is connected to stationary contact 22R while contact 22Q is connected through resistance 226 to power supply $E_{bb1}$. Oscillator coil 235 is connected through contacts 21L—22L to the plate 240 of oscillator tube 241 while the other side of coil 235 is connected through contacts 21M—22M to the grid 242 of oscillator 241 through capacitance 244. The grid side of capacitance 244 is in its turn connected to ground through resistance 246 while the other side of capacitance 244 is connected to ground through another capacitance 248. Cathode 250 of tube 241 is also connected to ground. Plate 240 of tube 241 is also connected through resistance 241 to a second power supply $E_{bb2}$ through conductor 252 having a grounding capacitor 253. Resistor 251 is also connected to the plate 255 of converter tube 256 through resistances 258 and 259. Grid 260 of tube 256 is connected to ground through three separate paths, one comprising coil 236 which is connected to grid 260 through contacts 21N—22N and is connected to ground through contacts 21P—22P.

The second path to ground is through the system of series resistances 262 and 263, the third path being through the vertical capacitance 265. Cathode 267 of tube 256 is also connected to ground. Connected to plate 255 of tube 256 through resistance 259 is the input circuit of the intermediate frequency amplifier of the television chassis itself. This input circuit consists of a series combination comprising a vertical inductance 270 and a capacitance 271, while the second capacitance 272 serves to by-pass to ground all the frequencies higher than the intermediate frequency of the television set itself.

As previously shown, the local oscillator tank inductance is wound on the same panel 13 and on the same form 275 on which the output coil 237 of the radio frequency amplifier tube 213 is wound so that injections into converter tube 255 through coil 236 also mounted on the same form 275 is obtained by mutual inductance coupling.

The previously described local oscillator using tube 241 is a Colpitts oscillator having cathod 250 grounded and a vernier tuning capacitor 280 from plate to ground. This vernier capacitor 280 described hereinafter will be referred to from now on as the fine tuning capacitor.

In parallel with the fine tuning capacitor 280 is a trimming capacitor 281 also connected between plate 240 of oscillator tube 241 and ground.

As a result of the amplification and selection provided by radio frequency amplifiers 204 and 213 and of the mixing operation performed by tube 256 on these amplified signals and signals from oscillator tube 241, a new signal having a carrier frequency corresponding to the intermediate frequency of the television set (between 20 and 25 megacycles for most of the presently used television sets) appears at the input of the intermediate frequency amplifier 167 (see Figures 1 and 2).

This intermediate frequency amplifier 167 is followed by circuits described previously in connection with Figure 1.

If now a U. H. F. channel is desired, switch 30 will be moved from the position shown in Figure 1 to the position shown in Figure 2 so that the antenna system 80 is now connected by means of twin leads, coaxial cable or other similar cable 110—111. Lead 110 of coaxial cable 110—111 is connected to the input side of the high pass filter 65 which consists of series capacitances 300 and 301 and shunt inductances 302, 303, 304. The function of high pass filter 65 is to attenuate all the frequencies below a certain value. More particularly, it should attenuate all the frequencies lying in the V. H. F. spectrum. At the same time, high pass filter 65 will actually be required in a tuner only when antenna system 80 is in a high V. H. F. field strength locality.

When this occurs, then the high pass filter 65 will be necessary to discriminate between the V. H. F. and the U. H. F. signals. High pass filter 65 is followed by a band preselector circuit 120. The band preselector 120 consists of a stationary circuit 310 and a movable circuit 311 mounted on each panel 14 of U. H. F. turret 11.

The stationary portion 310 of band preselector 120 consists of two inductances 313 and 314 connected in series with the center tap grounded. The other two ends of inductances 313 and 314 are grounded through trimming capacitors 316 and 317, respectively. Coil 313 is connected to stationary contacts 22*a* and 22*b* while coil 314 is connected to stationary contacts 22*e* and 22*f*. Grounded center tap between coils 313 and 314 is connected to stationary contacts 22*c* and 22*d*.

When, therefore, U. H. F. turret 11 is rotated so that the contacts 21 of the correct panel 14 come into engagement with the above-described stationary contacts 22, the electrical circuit 311 mounted on panels 14 will be connected to coils 313 and 314. For example, if the circuit shown in Figure 2 is mounted on panel 14, then inductance 320 will be connected on one side to inductance 313 and on the other side to ground through inductance 321, while inductance 322 will be connected on one side to capacitance 314 and on the other again through inductance 321 to ground.

When inductances 320, 321 and 322 are connected to the stationary portion 310 of band preselector 120, band preselector 120 will pass all the U. H. F. frequencies lying within preselected limits, the limits being determined by which particular panel 14 is connected to the stationary portion 310 of band preselector 120.

In the example as previously mentioned the band preselector should pass 10 or less U. H. F. frequencies out of a total of 70 U. H. F. channels.

Although I have shown the movable circuit 311 of band preselector 120 as consisting of inductances 320, 321, 322 connected to form a T network, actually different kinds of networks can be used instead of the one shown in Figure 2. For example, a generalized network could be used where instead of coils 320, 321 and 322 impedances Z1, Z2 and Z3 are connected to form a T section or also coil 321 may be substituted by a lead to ground while coils 320 and 322 are so positioned that they become mutually coupled.

Any one of these three systems may be used as the movable portion 311 of band preselector 120. High pass filter 65 is connected to band preselector 120 at a point 330 of coil 313, while mixer 66 comprising in this case a crystal 332 is connected to a point 333 of coil 314. Mutually coupled with coil 314 is the oscillator frequency injecting device 335 which in this case consists of two coils, one coil 336 mutually coupled with coil 314. The other coil 337 is mutually coupled to the tank coil 340 of U. H. F. oscillator 130. U. H. F. oscillator 130 is also a Colpitts type oscillator which is provided with a stationary portion 341 and a movable portion 342. Stationary portion 341 consists of tube 344 of which the plate 345 is connected to one side of inductance 340. The cathode 346 is connected to ground, and grid 348 is connected to ground through resistance 349 and to the other side of inductance 340 through capacitances 350 and 351.

To the mid point of inductance 340 is connected a resistance 353 which in its turn is connected to power supply $E_{bb3}$. A path to ground for the high frequency signals is provided by capacitance 354 connected between resistance 353 and ground.

When no other circuit elements are connected to U. H. F. oscillator 130, my novel U. H. F. oscillator 130 will oscillate at a frequency approximately intermediate between the lowest frequency and the highest frequency at which it will have to oscillate when other circuit elements 342 are introduced into the U. H. F. oscillator 130.

In the present embodiment the frequency at which U. H. F. oscillator 130 will oscillate when no other circuit elements but those connected in the stationary part 341 are used is 470 megacycles.

Incremental tuning is the technique of using the predominant frequency controlling element permanently mounted into the circuit and using comparatively high impedance circuit elements on the turret panels to vary the operating frequency by relatively small amounts.

It will be seen that this new arrangement allows greater tolerances of contact resistance, inductance and capacitance variation to occur before reaching the end of operating tolerances.

In the present state of the art, incremental tuning combined with the use of multiple contacts allows proper operation of oscillators, band pre-selectors and other circuits to frequency higher than 1,000 megacycles.

The movable part 342 of U. H. F. oscillator 130 may consist as shown in Figure 2 of coil 360 connected on one side to the movable contacts 21*g* and 21*h* and on the other side to movable contacts 21*j* and 21*k*. When the contacts 21 of panel 14 are in engagement with the respective stationary contacts 22, then the contacts 21 of panel 15 are in engagement with their respective stationary contacts 22 and as shown in Figure 2, it means that now coil 360 is connected in parallel with coil 340 through contacts 21*g*—22*g*, 21*h*—22*h*, 21*j*—22*j* and 21*k*—22*k*.

The addition of a coil in shunt to coil 340 causes as is well known in the art the resonant frequency of U. H. F. oscillator 130 to increase with respect to the frequency of oscillation obtained when no additional circuit element was added to the stationary part 341.

In my work, I have found that when using a 50 ohm source (antenna or signal generator) I am able, by proper design of the band pre-selector circuits, to properly transform the impedance to a higher value approximately 300 ohms with presently available crystal mixers which increases the voltage available at the crystal mixer to essentially compensate for the normal conversion loss at the crystal mix time.

The combination of the band pre-selector and the crystal mixers operating under these conditions operates at essentially the same output as input voltage.

It is, of course, understood that the capacitance needed to complete the tank circuit of oscillator 130 of which inductance 340 is one part may be provided by interelectric capacitance of tube 344 plus the wiring capacitances.

As previously mentioned, coil 337 of injecting device 335 is mutually coupled to inductance 340 of the tank circuit of oscillator 130, the other side 336 of the injecting device being mutually coupled to coil 314 of band preselector 120 so that the input signal to U. H. F. mixer 66 comprising crystal 332 will consist of the local generated U. H. F. oscillations and the U. H. F. signals not rejected by band preselector 120.

The addition of a second coil whose resonant frequency is higher than the first will increase the resonant frequency of the first coil when connected to it. Third and fourth coils may also be added and if the resonant frequency of each new coil added is higher than the combined resonant frequency of the other coils, the resonant frequency with the added coil will continue to raise the resonant frequency.

Using currently available local oscillator tubes and the use of four parallel circuits in the frequency determining elements, oscillator frequency above 1,300 megacycles have been obtained.

The frequency determining elements were lumped coils and capacitances despite the statements in literature that lumped contacts are of little value above 500 megacycles.

As a result of this mixing operation, the output signal from crystal mixer 332 will have a new carrier having a frequency in the V. H. F. band. This signal is now fed to the input circuit of the V. H. F. turret 10 through contacts 71—72 and 74—75 to switch 30 and through the unbalanced to balanced transformer 370 consisting of mutually coupled coils 371 and 372, coils 371 connected to crystal mixer 332 being grounded at one end and coils 372 being connected, respectively, to contacts 71 and 75 of switch 30 so that the signal introduced into the V. H. F. turret 10 will be balanced in the same way as was balanced the signal coming directly from antenna 80.

When instead of a higher frequency of oscillation it it desired to make U. H. F. oscillator 130 to oscillate at a frequency lower than the one at which it oscillates when no other circuits are connected to stationary circuit 341, then as shown in Figure 2 on panel 15 corresponding, for example, to the third band in which the U. H. F. channels have been divided in this embodiment of my present invention, a capacitance 380 is connected across stationary contacts 22*g*, 22*h*, 22*j*, 22*k* through movable contacts 21*g*, 21*h*, 21*j*, 21*k* instead of inductance 360.

The introduction of a capacitance in parallel with inductance 340 causes the total capacitance across inductance 340 to increase, thereby decreasing the frequency of oscillation of U. H. F. oscillator 130 while before when inductance 360 was connected in place of capacitance 380, the frequency of oscillation of oscillator 130 was increased because the parallel combination of inductances 360 and 340 produces an equivalent inductance of a value less than the smaller of the two inductances 340 and 360, thereby increasing the frequency of oscillation of oscillator 130.

To summarize the above and referring also to Figures 6 and 7 in addition to Figure 2, when a V. H. F. signal is desired, switch 30 is moved to the V position so that the antenna is connected directly into the preselected antenna segment 12 of V. F. H. turret 10. At the same time, the corresponding oscillator converter segment 13 engages the stationary contacts 22 to connect electrical circuits to the V. H. F. oscillator 140, the radio frequency amplifier 141 and the V. H. F. converter 154, the input circuit to the V. H. F. radio frequency amplifier 141 being mutually coupled to the antenna 80 through the circuits mounted on panel 12.

As a result of the electrical operations performed by the radio frequency amplifier at 141, V. H. F. oscillator 140 and V. H. F. converter 154, a signal having the frequency to which the intermediate amplifier 167 is tuned will appear across the input of intermediate frequency amplifier 167 and, therefore, produce the desired image on the cathode ray tube 177 and the corresponding sound at speaker 196.

When, on the other hand, a U. H. F. channel is desired, switch 30 will be moved to the position shown in Figure 2 so that the antenna system 80 is connected to the high pass filter 65 which as previously mentioned will pass only the U. H. F. signals, attenuating to substantially reject all other signals.

If U. H. F. turret 11 is now positioned as shown in Figure 2, band preselector 120 in this particular example will pass all frequencies between 686 megacycles and 746 megacycles, while oscillator 130 will oscillate at a frequency of 530 megacycles.

As a result of the mixing operation occurring at crystal mixer 66, ten V. H. F. signals may appear across coil 371 connected to the output of mixer 66, the ten V. H. F. signals of this particular example having V. H. F. frequencies from 156 to 216, each with a band width of six megacycles.

These V. H. F. frequencies as can be seen in Figures 6 and 7 corresponding to ten V. H. F. channels are indicated in Figures 6 and 7 as 6A, 6B, 6C, 7, 8, 9, 10, 11, 12, 13. If, therefore, now V. H. F. turret 10 is rotated, for example, to what in V. H. F. reception corresponded to channel 7 (174–180 megacycles) that V. H. F. signal of the ten appearing across coil 371 of transformer 370 which has frequencies lying between 174 and 180 megacycles will appear across the input of the V. H. F. radio frequency amplifier 141, will mix with the V. H. F. oscillator signal (which may have a frequency of 154 megacycles if an intermediate frequency to the television set of 22 megacycles is desired) and will be converted into a signal having a frequency to which the intermediate frequency amplifier 167 is tuned (in this example 22 megacycles) so that the desired image will apear on cathode ray tube 177 and the desired sound will appear at speaker 196.

As can be seen from this example, a number of V. H. F. channels, namely 6A, 6B, 6C, 7, 8, 9, 10, 11, 12, and 13 are used not only for tuning and reception of V. H. F. signals directly from antenna 80 but also to tune V. H. F. signals converted from their original U. H. F. level by converter 66. When used for U. H. F. tuning they will be numbered as seen in Figure 6 from 0 to 9, 0 corresponding to 6A and 9 to channel 13.

The U. H. F. bands, on the other hand, will be numbered from 1 to 8 where at band 1 the U. H. F. oscillator 130 will oscillate at 290 megacycles while at band 8 the U. H. F. oscillator 130 will oscillate at 710 megacycles. V. H. F. channels 6A, 6B and 6C do not correspond to any of the existing V. H. F. channels but are used and added to the original V. H. F. channels 2, 3, 4, 5, 6, 7, 8, 9, 10, 11, 12, and 13 in order to provide a tuning range in th V. H. F. region from 156 megacycles to 216 megacycles.

As shown in Figures 6 and 7, in order to receive a U. H. F. signal it will only be necessary to combine the correct U. H. F. band (decade numbers) with the correct V. H. F. channel which then corresponds to the digit of the desired U. H. F. channel. In other words, as previously shown, to receive U. H. F. channel 53, first band 5 is selected, then the V. H. F. channel is selected which corresponds to number 3 when used together with U. H. F. turret 11.

From the above, it is now evident that by the use of incremental tuning, that is, by the addition of electrical circuits to pre-existing ones, I can obtain not only eight different preselectors 120 to pass eight different bands, but I can also obtain eight frequencies of oscillations for oscillator 130 and although my novel tuner will operate at U. H. F. frequencies between approximately 400 and 90 megacycles by the particular arrangement of the circuit and the use of incremental tuning of the incremental networks which are for band preselector 120 or U. H. F. oscillator 130.

The incremental networks may all be made of lumped constants, for example, the above-mentioned inductances and capacitances for band preselector 120 and U. H. F. oscillator 13 may all be lumped capacitances and lumped inductances of the form well-known in the art. In other words, by the particular means used in my novel tuner, it becomes unnecessary to use tuning elements up to the present time considered to be the only ones operable at U. H. F., namely open-wire and stubs. It is evident, on the other hand, that if desired, open-wire transmission lines and coaxial stubs may be used in place of the lumped constants used in the present embodiment. Furthermore, the particular type of incremental tuning is obtained in my novel tuner by controlling the coupling and the frequency of resonance and the incremental networks which were previously described and connected to band preselector 120 and U. H. F. oscillator 130 for each position of U. H. F. turret 11.

More particularly, my novel incremental method for tuning the U. H. F. oscillator 130 to different frequencies of oscillations actually may be considered as a displacement of resonant frequency of U. H. F. oscillator 130 with the addition of incremental networks. This displacement of the resonant frequency is obtained by connecting to the stationary portion 341 of oscillator 130 an electrical circuit having a resonant frequency different from that of the fixed circuit 341. For example, it was described above that when portion 341 of oscillator 130 is not connected to any additional network, then oscillator 130 will oscillate at 470 megacycles. If now I introduced a cross portion 341 of oscillator circuit 130, a circuit having a frequency above 530 megacycles, for example, approximately 600 megacycles, will obtain a new resonant frequency for the oscillator which is neither 470 nor 600 megacycles but will lie between these two values, and in this particular case will have a value of 530 megacycles.

As previously mentioned, this novel incremental tuning means is applicable also in a similar way with more complex circuit configurations to the band preselector 120. It is also necessary to point out that although in the present embodiment the oscillator injection device 335 was shown as two coils connected in parallel 336 and 337 and the injection into coil 314 was called injection by mutual coupling, actually this type of coupling is a very complex one; in fact, not only mutual inductive coupling but also capacitive coupling is used.

Instead of injection device 335, any other device capable of performing the function of device 335 may be used in its place. In other words, it is not at all necessary for my novel tuner to operate successfully to use the injection device 335 shown in Figure 2 but other types of oscillator injection may be used.

Referring now to Figure 4 showing a pair of V. H. F. segments mounted on their respective panels adapted to receive V. H. F. channel 7, it will be seen that radio frequency segment 12 comprises a form 400 on which are wound coils 200 and 201. Form 400 is cylindrical in shape and is kept in place on the panel 12, made for example of plastic material, by soldering the end connections of coils 200 and 201 to the interior extensions 401 of contacts 21. Form 400 is also secured against axial movement by the two shoulders 403 and 404 positioned at each end of form 400 and being an integral part of panel molding 12.

Similarly, oscillator converter and radio frequency amplifier cols 235, 236, 237, respectvely, are mounted on a form 405, cylindrical in shape and of insulated substance. As in previously described panel 12, this panel 13 on which the above-mentioned coils are mounted is also provided with end shoulders 407 and 408 which serve to secure form 405 against axial movement. In this case too, terminals of coils 235, 236, 237 are soldered to the inner extensions 410 of outwardly extending contact 21.

It is further seen that inside form 405 is positioned a lug 411 externally threaded to be engaged by a wire spring 412. Lug 411 is located internally with respect to coil 235. It is possible to produce a circuit variation in the frequency of oscillation of V. H. F. oscillator 140 as shown in the above-mentioned patent.

Filaments 223 and 228 of triode combinations 241—256 and 204—213 are connected to the filament supply (referred to in Figure 2 as "6.3v") through chokes 229 and 245, respectively. Furthermore, filament 223 is by-passed to ground by capacitances 233 and 234 while the shield of conductor 238 leading to the filament supply 6.3v is grounded at 239.

Filament 228 is also by-passed to ground by capacitance 243.

The use of only two filaments for four triodes, of course, presupposes the use of double triodes, for example, 6BQ7 for tubes 204—213 and 6J6 for tubes 241—256, although any other suitable multi-electrode tube may be successfully used.

Filament 247 of U. H. F. oscillator tube 344 is grounded at one end through choke 249 while at the other end it is connected to the filament supply A through choke 343. Furthermore, filament 247 is provided with capacitance 347 bridging the two terminals of filament 247. To further compensate for interwire inductance, it is possible to add in parallel with choke 249 a small inductance 352.

Referring next to Figure 5 showing the actual structure of a set of panels 14 and 15 of U. H. F. turret 11 adapted to receive U. H. F. channels 50—59 and shown schematically in Fig. 2, it is there seen that each panel 14 and each panel 15 is provided with conductive plates 415 and 416, respectively.

Plate 415 is secured to panel 14 by soldering connections 418 to the internal extensions 420 of contacts 21. Coil 321 is connected between plate 14 and coils 320 and 322. Coil 320 is connected to coil 321 at one end and to the internal extension 420 of contacts 21. Coil 322 is also connected at one end to coil 321 and at the other end to the external extension 420 of contacts 21. Coil 360 mounted on panel 15 is soldered to the external extensions 431 of contacts 21 while plate 416 is secured to panel 15 through connector 423 soldered to another internal extension 431 of contacts 21.

Referring now to Figures 8, 9, 11 and 12 showing the switch mechanism of Figures 1 and 2, stationary contacts 83 and 84 are connected to the antenna system referred to in Figures 1 and 2 as 80 through leads 81 and 82. Stationary contacts 83 and 84 are actually conductive bars as shown more clearly in Figures 11 and 12. To stationary contacts 60 and 63 are connected by soldering or any other suitable means leads 110 and 111 leading to the high pass filter 65. As shown in Figure 10, stationary contacts 60 and 63 are also conductive bars. Another set of stationary contacts 94 and 95 is permanently grounded by means of a grounding plate 430. Stationary contact 431 is schematically shown in Figure 8 with the contact system referred to in Figures 1 and 2 as 88—89—90—93 while stationary contact 432 represents system 96—103—104—105. Actually as shown in Figure 10, contacts 431 and 432 are also stationary conductive bars insulated in any proper way from grounding plate 430.

The contact system referred to in Figures 1 and 2 as 72, 91 and 92 is shown in Figures 8, 9 and 10 as stationary contact 434, while the stationary contact structure referred to in the above-mentioned figures as 74—101 is in Figures 9 and 10 shown as conductive bar 435. Contacts 71 and 75 are also stationary in the form of a metal conductive bar.

The movable contacts 58—59, 87—102 and 70—73 as shown in Figure 10 are actually small conductive bars carried by an insulated shaft 40, the shaft being operated as also shown in Figures 1 and 2 by cam 371 which in its turn may be moved by rotation of knob 35.

Referring in particular to Figure 10, it is here thought necessary to point out that movable contacts 87 and 102 while in the position corresponding to Figure 9 and as also shown in Figure 10 must be in perfect contact with ground plate 430 if good balancing of the U. H. F. signals is desired. It will be noted that both contacts 87 and 102 have extensions which when switch 30 is in the position of Figure 9, position in Figures 1 and 2 referred to as position U, make perfect contact with grounded plate 430.

The perfect grounding obtained by my novel switch 30 is necessary to eliminate the possibility that V. H. F. signals reach the V. H. F. turret 10 during U. H. F. operation when the contacts connecting antenna 80 to V. H. F. turret 10 are open. It is known, in fact, that because of the capacitance existing between switch contacts, V. H. F. signals could be introduced to the V. H. F. turret 10 during U. H. F. operation through capacitance coupling between the open contacts of switch 30.

By providing the above-mentioned perfect ground, I, therefore, obtain a grounded shield between the antenna contacts of switch 30 and the V. H. F. contacts of switch 30 so that the above-mentioned capacitance coupling is completely eliminated.

The television tuner heretofore described schematically primarily in connection with Figure 1 may more readily be seen in the exploded view of Figure 10 and the cross-sectional views of Figures 11 and 12.

It will be seen from these figures that the structure of turrets 10 and 11 corresponds substantially to the structure previously described in connection with Figure 2, and basically each of these structures corresponds mechanically to the structure shown in the above-mentioned patent.

Turret 11 comprises a plurality of sets of panels 14, 15 and a center dividing indexing disc 500, the said disc having a plurality of notches adapted to receive extensions of panels 14 and 15. The discs 500 is secured to shaft 34 in the U. H. F. turret 11. Shaft 34 also carries the outer discs 501 and 502 and the spring clips 503, 504 which position, respectively, the outer ends of panels 14 and 15. This specific type of mounting of the panels has been shown in the prior patent.

Shaft 34 also has secured thereto a cam 37 which as previously described is so arranged that the rise 36 will operate the operating rod 40 for switch 30 in an upward direction to disconnect the U. H. F. panels on turret 11 and to connect the V. H. F. panels on turret 10 to the antenna as previously described. Shaft 32 is concentric with and passes within shaft 34, shaft 34 being a hollow shaft to permit this to occur.

The center dividing disc 510 for the panels 12 and 13 of turret 10 is fixed to the shaft 32. Panels 12 and 13 are secured in position by the outer plates 511 and 512 and spring clips 513 and 514 in the manner previously mentioned in connection with the same type of securement for the panels of turret 11.

Shaft 32 is itself a hollow sleeve carrying rotatably within the said shaft the shaft 51. Shaft 51 extends entirely through shaft 32 and at its outer end on the opposite side carries the dielectric member 50 which is rotatable between an electrode 520 secured by rivet 521 to wall 522 of chassis 525 and another electrode 526 mounted on an insulating button and secured to said wall by collar 527 held in place on the wall by rivets 528.

The chassis 525 has a main top wall 530 carrying various circuit components including tubes for the oscillator circuits and side walls 531, 532. The bottom wall 535 is shaped as a hollow container adapted when positioned over the bottom end of the side walls 531, 532 as shown in Figure 12 to resiliently engage these walls to complete a structure encasing the rotatable turrets.

Shaft 34 is received in the notch 540 of wall 541 of chassis 525 and is positioned and retained therein by the upper edge 542 of section 543 of bottom container 535. Shaft 32 is received in open ended slot 551 of wall 522 of the chassis and is retained therein by the upper edge 553 of wall 554 of the lower section 535 of the chassis enclosure. A longitudinal spring member 552 in annular recess 550 and held by screws 556 maintains this end of the shaft in position.

Leaf spring member 530 bears between wall 522 and dielectric member 50 biasing dielectric member 50 against the electrode 520 of the fine tuner capacitor. The leaf spring member 560 is located at a point surrounding the shaft 51 but below the electrode 526 so that it will not interfere with the desired variable capacitance of the fine tuner assembly comprising electrodes 520 and 526 and dielectric member 50.

Each of the panels 12, 13, 14, and 15 is provided with a plurality of contact elements as indicated and numbered more specifically at Figure 1, and these contact elements cooperate again as indicated and numbered at Figure 1 with stationary contact members 22. Stationary contact members 22 for the V. H. F. turret 10 are kidney type contacts formed from leaf spring elements supported on the insulating panel 570. Contact members 22 for the U. H. F. turret 11 are similarly shaped and are supported on the insulating panel 571.

A central divider plate 573 is carried by the chassis 525 to register with the divider and indexing member 510 for turret 10 and to combine with the said divider and indexing member 510 to provide a shield between the oscillator and antenna segments of the V. H. F. turret 10. Similarly, a metallic divider 575 is provided carried by the chassis 525 for the U. H. F. turret 10 to register with the central divider and indexing plate 500 of the U. H. F. turret 11 to comprise a complete shield between the elements on each side of the divider 500 of turret 11.

In addition, a dividing plate 580 is provided for chassis 525 having a notch 581 to pass over shaft 34. This dividing plate serves substantially to shield the U. H. F. turret 11 from the V. H. F. turret 10.

The switch 30 which is operated by the operating rod 50 and cam 37 has been specifically described previously not only in connection with Figures 1 and 2 but also in connection with Figures 8 and 9 and also by reference to Figures 10 and 12.

It will be seen from the cross-sectional view of Figure 12 that the entire combination turret chassis 525 may be mounted on the main chassis 600 of the television set in a position where it may be nested or inserted in part under the television tube 601. This type of mounting of the television tuner chassis 525 is substantially identical with the mounting previously attainable with television input tuners solely adapted to the reception of V. H. F. signals.

Even the height of the switch 30 matches the height of the tubes and other components on the top of the chassis wall 530, which elements were previously present on prior input tuners adapted solely for V. H. F.

Consequently, the lateral and vertical dimensions of the television chassis 600 and the cabinet need not be increased at all to accommodate my novel tuner. However, as will be obvious from an examination of Figures 10 and 11, my novel tuner is longer fore and aft in the cabinet than a tuner adapted solely for V. H. F.

This fore and aft dimension is not critical, however, since components of the television receiver which need not be manually operated may be moved to a slightly different position in order to accommodate the approximately five inches of extra length required for my novel television input tuner. Consequently, all dimensions of the television set may remain the same.

In Figure 12 I have also shown more specifically the operation of the spring member 41 for my novel switch 30. While the spring 41 has been indicated schematically merely as a compression spring in Figures 1 and 2, actually as will be seen from an examination of Figure 12, spring 41 is a leaf spring which engages a hook **41*a* on the operating rod 50 of the television input tuner, biasing the operating rod 40 to the dotted line position shown in Figure 12 but permitting the operating rod 40 to be lifted to the solid line position indicated in Figure 12 by operation of rise 36 of cam 37**.

In Figures 10 and 12 I have also shown more specifically my novel center divider units 510 and 500 showing how the center divider 510, for instance, is formed by a series of arcs 610, 610 intersecting each other at a series of apices 611. Each apex 611 corresponds to a particular panel location and the center divider 570 is so integrated with the panels 12 and 13 on the one turret or 14 and 15 on the other turret so that the line of contacts of each panel will be in exact engagement with the stationary contacts when the apex 611 associated with that particular panel is in registry with the detent roller 620. Detent roller 620 is mounted on a leaf spring 623 carried by the chassis 525 which biases the roller 620 toward the center divider 510.

It is important that each panel location be exactly fixed. Consequently, the detent member or roller 620 must be so arranged that an exact physical location thereof with respect to the indexing disc 510 must be obtained. Since the utilization of minute teeth on the indexing member 510 and minute detents instead of roller 620 are inconsistent with rugged mechanical operation, it is necessary to devise a structure which will provide the same exactness while nevertheless having dependable structural strength.

Consequently, the inwardly directed apices 611 of the indexing disc 510 which are actually not contacted by the indexing roller 620 are utilized to determine the exact indexing position. The roller 620 in each case when it comes to rest with respect to a particular inwardly directed apex 611 engages points 621 and 622 on the arc 610 on each side of the inwardly directed apex 611.

The roller is manufactured so that it is as perfectly cylindrical as possible, and the arcuate curves 610 are cut so that they match each other as nearly as is mechanically possible. Consequently, the roller 620 will be biased by spring 623 into a position where points 621 and 622 on either side of the inwardly directed apex 611 will be equidistant from the inwardly directed apex 611, thereby obtaining an exact indexing of point 611 and consequently obtaining an exact positioning of the particular set of panels associated with apex 611 so that the contacts thereof will be in exact registry with the stationary contacts.

This exact registration of the contacts is of extreme importance in the V. H. F. and U. H. F. frequency bands where engagement of contacts only a slight distance from the exact predetermined point of engagement may result in detuning of the set.

All of the above structure description is primarily by way of explaining further the structure elements already generally described in connection with Figure 1, and reference to Figure 1 will serve to show once more the relationship of the structural elements to the system therein described.

As previously pointed out also in connection with Figure 1, a knob 35 is provided for securement to shaft 34 and operation of said shaft. A knob 33 is provided for securement to shaft 32 and operation of said shaft, and a knob 52 is provided for securement to shaft 51 and operation of said shaft. One form which these knobs may take is shown in Figures 11, 13 and 14.

Essentially, it must be understood that the knobs are arranged so that a decade function will be indicated to the user in terms of the channel received. In other words, the indicia visible to the user on operation of the knobs will indicate to him whether he is, for instance, at channel 76 U. H. F. or at channel 12 V. H. F. Consequently, the knobs should be so arranged that they may cooperate with each other. This kind of cooperation is, however, complicated by the fact that the positions of turret 10 and hence of knob 33 for turret 10 when used in V. H. F. reception do not correspond numerically in a decade system to the position of these turrets and knobs in the U. H. F. system.

This may be more fully understood from a re-examination of Figures 6 and 7 wherein it will be seen that in the particular embodiment shown, V. H. F. channels 2, 3, 4, 5 and 6 are used for V. H. F. reception only and are not combined with the U. H. F. channels for U. H. F. reception. Panels 6A, 6B and 6C, although they correspond to V. H. F. frequencies which are adjacent V. H. F. channels 6 and 7, are actually not used for V. H. F. reception at all but are provided in the V. H. F. turret in order to make possible a decade system hereinbefore mentioned and described.

There would be no problem at all if there were only nine V. H. F. channels since then simple alternate openings between the alternate channel markings on the V. H. F. knob would register with corresponding indicia on the U. H. F. knob to provide an indication of the particular U. H. F. setting. However, since the indicia must be presented by means of a well-known decimal numbering system while only ten parts of a quindecimal numbering system (on the V. H. F. turret) are to be used in connection with U. H. F. indicia to present the decimal indicia for U. H. F. channels a more complex knob arrangement is required.

The U. H. F. knob 35 has a large enough diameter, although masked in part by the V. H. F. knob 33 and by the masking member 700 so that it may be accessible for manual rotation. To facilitate manual rotation, the U. H. F. knob 35 is suitably treated to permit being readily grasped by the fingers as, for instance, by being indented as at 701, 701 of Figures 13 and 14.

The mask 700 is supported on the front of the cabinet by means of extensions 703, 704 which space the mask away from the front of the cabinet so that it may cover the indicia carrying sections of knobs 33 and 35. Mask 700 is provided with a window 710 through which the indicia carrying sections of knobs 33, 35 may be visible. The mask 700 also has a central opening 711 through which an operating knob **33*a* for the V. H. F. knob 33 and integral with the V. H. F. knob 33** may extend.

Operating knob **33*a* for the V. H. F. knob 33 is also provided with a recess 33*b* in which the operating knob 52 for the fine tuner shaft 51 may in part nest, the said operating knob 52** being independently manually rotatable. The V. H. F. knob 33 is provided with two rows of indicia. The inner row of indicia 733 is for V. H. F. channel selection. The outer row of indicia 734 is for U. H. F. channel selection.

A shutter 720 is provided carried by the spring member 722 which in turn is rotatably supported on pin 723 carried in opening 724 of the mask 700. The spring member 722 is curved at 723 so that it engages the indented surface of knob operator 33*a* which is behind the mask 700. It will be obvious that when the knob 33*a* is rotated in a clockwise direction with respect to Figures 13 and 14, the friction of the indented surface of knob 33*a* against the spring member 722 will raise the shutter 720 to the upper position where the U. H. F. indicia 734 are concealed by the shutter and the V. H. F. indicia are revealed.

Rotation in the counterclockwise direction will by the movement of the surface of knob 33 against end 723 of spring 722 move the shutter 720 to the down position of window 710 where the V. H. F. indicia are concealed and the U. H. F. indicia revealed.

In operating the set using this type of knob, it should, therefore, be understood that rotation in a clockwise direction will bring V. H. F. indicia into view. Rotation of knob 33*a* in a counterclockwise direction will bring U. H. F. indicia into view. When the device is to be turned to operate for V. H. F. channels only the knob 35 must first be rotated until the point 725 is visible in the U. H. F. window. Thereafter, rotation in the V. H. F. direction of knob 33*a* will provide V. H. F. indicia.

When operating in the U. H. F. range, the V. H. F. knob must first be turned in the U. H. F. direction to reveal the U. H. F. indicia. Thereafter, rotation of knob 35 to the particular tens portion of the U. H. F. channel desired and rotation of the knob 33*a* to the particular units portion of the U. H. F. channel desired will select the U. H. F. channel.

The indicia 734 of knob section 33 are numbered to correspond with U. H. F. units portions of the U. H. F. channels. These units indicia of indicia circle 734 are spaced apart by windows 730, 730 through which the indicia on U. H. F. knob 35 may be viewed in conjunction with the specific indicia in circle 734 to provide an indication of the tens place of the U. H. F. channel visible through the window 730 from knob 35 and the units place of the particular U. H. F. channel visible through the masked window 710 and on circle 734.

While this general system has been found to be workable and usable, it is preferred that the user not be limited to rotation of the V. H. F. knob in one direction for one set of channels and in the opposite direction for the other set of channels.

Consequently, Figures 15, 16 and 17 show a modified form of knob arrangement which does not require a specific directional rotation.

Here again a U. H. F. operating knob 835 mounted on shaft 34 is provided. A V. H. F. operating knob 833*a* mounted on shaft 32 is provided, and a fine tuner 852 mounted on shaft 51 is provided. A mask 800 is provided in front of the V. H. F. indicia circle 833 and is secured by any suitable means as, for instance, pin 803 to the U. H. F. knob 835 so that it is rotatable therewith. The mask 800 is provided at the V. H. F. position of turret 11 at which switch 30 is thrown to the V. H. F. position with the V. H. F. indicating legend as shown in Figure 16. When this V. H. F. indicating legend is under the arrow 805, the operator knows that the set is in condition for tuning only to V. H. F. signals.

When any other angular position of turret 11 is obtained by rotation of knob 835, the V. H. F. indicator moves away from under the arrow 805 as shown in Figure 17, and a U. H. F. indicating window 810, 810 on the mask 800 moves under the arrow 805 on the cabinet.

Consequently, the user knows whether the knobs have been turned to receive V. H. F. or U. H. F.

The type of V. H. F. indicating knob used for this purpose is the same knob 33—33*a* shown in connection with Figure 14.

Thus, when the elements are in the V. H. F. indicating position of Figure 16, only the V. H. F. line of indicia 733 is visible through the lower window 812 of the mask 800. At any other angular position of knob 835, turret 11 and mask 800, the upper line of windows 810 move under the arrow 805 and only the indicia on knob 835 visible through windows 730 of knob 33 can be viewed through windows 810 of the mask 800. These are viewed in conjunction with the units indicia in line 734 of knob 33 which cooperate with the U. H. F. indicia visible through the windows of knob 33 to provide the U. H. F. indicia.

By the utilization of a mask which moves with the U. H. F. knob, therefore, the user may readily see without being limited to a particular direction of rotation of the knobs whether the set is arranged for V. H. F. or U. H. F. reception and may readily select the V. H. F. or U. H. F. channel he desires.

In Figures 18, 19, and 20 I have shown a modified form of V. H. F.-U. H. F. knob control which utilizes knobs 935, 933 and 952 substantially identical with the knobs 833, 835 and 852 of Figures 15, 16, and 17. The indicia of knobs 935 are visible in conjunction with indicia of knob 933 in the same way as previously described. However, in place of the mask a manually operable indicator 910 is provided. Indicator 910 is rotatable in the cabinet front on shaft 900 and is provided with an appropriate operating handle 905. The indicator 910 has a section 903 marked V. H. F. which when turned to the position shown in Figure 19 will block the U. H. F. indicia and provide a pointer directed at the V. H. F. indicia and as shown in Figure 20 when rotated to the U. H. F. position will reveal the U. H. F. indicia and provide a suitably marked pointer 905 directed at the U. H. F. indicia.

It is, of course, possible to provide an energizing mechanism such as a solenoid controlled armature connected by an appropriate linkage to shaft 900 automatically to turn the indicator 910 in the appropriate direction as energized and deenergized by operation of switch 30.

In Figures 21 and 22 I have shown a structure which is substantially the equivalent of the mask structure 800 of Figures 15, 16 and 17 in that while the knobs 835 and 833 are the same, the masking element comprises the single bent strip 960 secured to the U. H. F. knob 835 and masking the outer row of U. H. F. indicia.

When the turret 11 is turned as described in connection with Figures 15 to 17 to the V. H. F. position under the arrow 805 on the cabinet, only the inner or V. H. F. indicia on knob 833 may be read under the arrow 805 while at any other position of the U. H. F. knob 835 the U. H. F. indicia become visible.

This is simply another development of the identical concept disclosed in Figures 15 to 17.

Similarly, Figure 23 shows a concept substantially identical with that of Figures 15 to 17 in which the U. H. F. knob 955 corresponds identically in operation to the U. H. F. knob 835 of Figure 15; the mask 956 corresponds identically in operation to the mask 800 of Figures 15 to 17; the V. H. F. knob 957*a* and its indicia carrying circle 957 correspond identically in function to the members 833*a* and 833 of Figures 15 to 17.

By sloping the mask 956, the indicia section 957 of knob 957*a* and the indicia section 955*a* of knob 955 and placing the entire knob assembly below the eye level of the user, I can ensure that only the window 970 corresponding either to window 812 or 810 of the mask of Figures 15 to 17 will be visible and carry any significance at any particular angular position of the knobs to the user.

In Figures 24 and 25 I have shown how a pair of lights 980 and 981 may be substituted for the mask 800 of Figures 15 to 17 or similar structures shown in Figures 18 to 23.

In the one case the lights 980, 981 are placed directly behind the units which provide the indicia. In the other case, in Figure 25, in order to make the lights more readily accessible for replacement, the light therefrom is led by the light conductive tubes 982, 983 to the indicia carrying members. These light conducting tubes may be made of any suitable plastic such as Lucite, the ends of which have been properly treated to receive and emit light.

The U. H. F. knob 985 is provided with the usual U. H. F. indicia already described in connection with Figures 14 to 23. The V. H. F. knob 986 is provided with the V. H. F. indicia and arranged as already pointed out in connection with Figures 14 to 23. However, the V. H. F. knob indicia are preferably inscribed thereon in such manner that they will not be visible except by light transmitted through the V. H. F. indicia section. The U. H. F. knob indicia are also preferably similarly arranged.

The lights 980 and 981, therefore, function when they are respectively turned on and off as the equivalent of the windows 810 and 812 of Figure 16, thereby providing as shown in Figures 26 and 27 U. H. F. or V. H. F. indicia in accordance with the particular light 980 or 981 which is turned on.

The lights 980 and 981 may be connected to appropriate contacts which may be provided on the switch 30 in an obvious manner to energize light 981 when the switch 30 is in the U position and to de-energize light 981 and energize light 980 when the switch is in the V position.

I have here shown a plurality of types of knob operating structures in order to indicate the type of operation which the user of the set must perform in order to obtain the desired channel setting and indication. This knob operation is of importance because it is the only portion of the tuning system which the user normally sees or even is aware of.

Consequently, the simplification of this knob operation to provide combined indicia apparently at one position corresponds to the kind of tuning operation the customer has come to expect. Particularly where the operation and indicia are automatic as in Figures 15 to 17 or Figures 24 and 25, the user will scarcely be aware that more than one operation is required and will find the rotation of the two knobs to provide the desired channel setting an extremely simple operation.

This simplified knob operation combined with the simplified channel selecting concept above described makes my novel U. H. F.-V. H. F. tuner an instrument which may readily be installed and used in connection with existing types of television construction.

Although for the preferred embodiment, I have used eight channels on the U. H. F. turret and increased the number of panels on the V. H. F. turret by three, it will be apparent from what is described hereinafter that I could within the spirit of this invention have increased the number of U. H. F. channels and retained the original number of V. H. F. channels. This, however, would have necessitated counting by seven or some smaller number and would have resulted in a complex indicating system.

This application is being filed simultaneously with the application of Aldo M. Scandurra, Serial No. 276,565, filed March 14, 1952, and the application of Marvin Loeb, Serial No. 276,543, filed March 14, 1952, now abandoned.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A television tuner for receiving U. H. F. signals and V. H. F. signals through antenna means comprising a U. H. F. channel selector and a V. H. F. channel selector; said U. H. F. channel selector having a system for converting U. H. F. signals into V. H. F. signals receivable by said V. H. F. channel selector; input terminals for the U. H. F. and V. H. F. channel selectors; a switch connecting the antenna means to the V. H. F. input terminals in one position thereof and, in another position thereof connecting the antenna means to the U. H. F. input terminals and connecting the output of the U. H. F. system to the V. H. F. channel selector; the U. H. F. channel selector selecting a group of U. H. F. signals; the V. H. F. channel selector, when the U. H. F. system is connected to the V. H. F. channel selector, selecting a specific signal from the group of converted signals selected by the U. H. F. channel selector; said channel selectors being axially aligned and mounted on concentric shafts; concentric manual control members connected to each shaft; each control member comprising a manually rotatable knob carrying indicia; the V. H. F. control member being mounted in front of and masking portions of the indicia of the U. H. F. control member; the U. H. F. shaft carrying a member for operating the switch to connect the antenna means to the V. H. F. input terminals at a predetermined angular position of said U. H. F. shaft; indicia means operable when said predetermined angular position of said U. H. F. shaft is reached to indicate that the television tuner is set for V. H. F. reception.

2. A television tuner for receiving U. H. F. signals and V. H. F. signals through antenna means comprising a U. H. F. channel selector and a V. H. F. channel selector; said U. H. F. channel selector having a system for converting U. H. F. signals into V. H. F. signals receivable by said V. H. F. channel selector; input terminals for the U. H. F. and V. H. F. channel selectors; a switch connecting the antenna means to the V. H. F. input terminals in one position thereof and, in another position thereof connecting the antenna means to the U. H. F. input terminals and connecting the output of the U. H. F. system to the V. H. F. channel selector; the U. H. F. channel selector selecting a group of U. H. F. signals; the V. H. F. channel selector, when the U. H. F. system is connected to the V. H. F. channel selector, selecting a specific signal from the group of converted signals selected by the U. H. F. channel selector; said channel selectors being axially aligned and mounted on concentric shafts; concentric manual control members connected to each shaft; each control member comprising a manually rotatable knob carrying indicia; the V. H. F. control member being mounted in front of and masking portions of the indicia of the U. H. F. control member; the U. H. F. shaft carrying a member for operating the switch to connect the antenna means to the V. H. F. input terminals at a predetermined angular position of said U. H. F. shaft; indicia means operable when said predetermined angular position of said U. H. F. shaft is reached to indicate that the television tuner is set for V. H. F. reception and indicia operable at other positions of said shaft to indicate that the television tuner is set for U. H. F. reception.

3. A television tuner for receiving U. H. F. signals and V. H. F. signals through antenna means comprising a U. H. F. channel selector and a V. H. F. channel selector; said U. H. F. channel selector having a system for converting U. H. F. signals into V. H. F. signals receivable by said V. H. F. channel selector; input terminals for the U. H. F. and V. H. F. channel selectors; a switch connecting the antenna means to the V. H. F. input terminals in one position thereof and, in another position thereof connecting the antenna means to the U. H. F. input terminals and connecting the output of the U. H. F. system to the V. H. F. channel selector; the U. H. F. channel selector selecting a group of U. H. F. signals; the V. H. F. channel selector, when the U. H. F. system is connected to the V. H. F. channel selector, selecting a specific signal from the group of converted signals selected by the U. H. F. channel selector; said channel selectors being axially aligned and mounted on concentric shafts; concentric manual control members connected to each shaft; each control member comprising a manually rotatable knob carrying indicia; the V. H. F. control member being mounted in front of and masking portions of the indicia of the U. H. F. control member; the U. H. F. shaft carrying a member for operating the switch to connect the antenna means to the V. H. F. input terminals at a predetermined angular position of said U. H. F. shaft; indicia means operable when said predetermined angular position of said U. H. F. shaft is reached to indicate that the television tuner is set for V. H. F. reception, said indicia means being operable at the other positions of said U. H. F. shaft to indicate that the television tuner is set for U. H. F. reception; said V. H. F. knob having a plurality of units indicia and an opening associated with said units indicia; the U. H. F. knob having a plurality of decade indicia visible through said openings and associated with the units indicia on the V. H. F. knob when the U. H. F. selector is used to indicate U. H. F. channels.

4. A television tuner for receiving U. H. F. signals and V. H. F. signals through antenna means comprising a U. H. F. channel selector and a V. H. F. channel selector; said U. H. F. channel selector having a system for converting U. H. F. signals into V. H. F. signals receivable by said V. H. F. channel selector; input terminals for the U. H. F. and V. H. F. channel selectors; a switch connecting the antenna means to the V. H. F. input terminals in one position thereof and, in another position thereof connecting the antenna means to the U. H. F. input terminals and connecting the output of the U. H. F. system to the V. H. F. channel selector; the U. H. F. channel selector selecting a group of U. H. F. signals; the V. H. F. channel selector, when the U. H. F. system is connected to the V. H. F. channel selector, selecting a specific signal from the group of converted signals selected by the U. H. F. channel selector; said channel selectors being axially aligned and mounted on concentric shafts; concentric manual control members connected to each shaft; each control member comprising a manually rotatable knob carrying indicia; the V. H. F. control member being mounted in front of and masking portions of the indicia of the U. H. F. control member; the U. H. F. shaft carrying a member for operating the switch to connect the antenna means to the V. H. F. input terminals at a predetermined angular position of said U. H. F. shaft; indicia means operable when said predetermined angular position of said U. H. F. shaft is reached to indicate that the television tuner is set for V. H. F. reception, said indicia means being operable at the other positions of said U. H. F. shaft to indicate that the television tuner is set for U. H. F. reception; said V. H. F. knob having a plurality of V. H. F. channel indicia and a plurality of additional units indicating areas; the U. H. F. knob having a plurality of decade indicia registerable with said areas and associated with the units areas on the V. H. F. knob when the U. H. F. selector is used to indicate U. H. F. channels.

5. A television tuner as defined by claim 2 in which the switch is operated by the switch operating member at the said other U. H. F. shaft positions to disconnect the antenna means from the V. H. F. input terminals and maintain interconnection between the U. H. F. system output and the V. H. F. input terminals, whereby received U. H. F. signals are converted to V. H. F. frequencies and thereupon translated by the V. H. F. channel selector.

6. A television tuner as defined by claim 3 in which the switch is operated by the switch operating member at the said other U. H. F. shaft positions to disconnect the antenna means from the V. H. F. input terminals and maintain interconnection between the U. H. F. system output and the V. H. F. input terminals, whereby received U. H. F. signals are converted to V. H. F. frequencies and thereupon translated by the V. H. F. channel selector; said indicia means being arranged to mask the decade indicia and the openings for U. H. F. indication when the U. H. F. shaft is at its said predetermined angular V. H. F. reception position.

7. A television tuner as defined by claim 4 in which the switch is operated by the switch operating member at the said other U. H. F. shaft positions to disconnect the antenna means from the V. H. F. input terminals and maintain interconnection between the U. H. F. system output and the V. H. F. input terminals, whereby received U. H. F. signals are converted to V. H. F. frequencies and thereupon translated by the V. H. F. channel selector; said indicia means being arranged to mask the decade indicia and the units areas for U. H. F. indication when the U. H. F. shaft is at its said predetermined angular V. H. F. reception position.

8. A television tuner for receiving U. H. F. signals and V. H. F. signals through antenna means comprising a U. H. F. channel selector and a V. H. F. channel selector; said U. H. F. channel selector having a system for converting U. H. F. signals into V. H. F. signals receivable by said V. H. F. channel selector; input terminals for the U. H. F. and V. H. F. channel selectors; a switch connecting the antenna means to the V. H. F. input terminals in one position thereof and, in another position thereof connecting the antenna means to the U. H. F. input terminals and connecting the output of the U. H. F. system to the V. H. F. channel selector; the U. H. F. channel selector selecting a group of U. H. F. signals; the V. H. F. channel selector, when the U. H. F. system is connected to the V. H. F. channel selector, selecting a specific signal from the group of converted signals selected by the U. H. F. channel selector; said channel selectors being axially aligned and mounted on concentric shafts; concentric manual control members connected to each shaft; each control member comprising a manually rotatable knob carrying indicia; the V. H. F. control member being mounted in front of and masking portions of the indicia of the U. H. F. control member; one of said shafts carrying a member for operating said switch to connect the antenna means selectively to the respective input terminals of said U. H. F. and V. H. F channel selectors in accordance with the angular position of said one shaft; and indicia means operable to indicate that the television tuner is set for U. H. F. or V. H. F. reception in accordance with said one shaft angular position.

References Cited in the file of this patent

UNITED STATES PATENTS

| | | |
|---|---|---|
| 2,124,023 | Albright et al. | July 19, 1938 |
| 2,288,539 | Morrison | June 30, 1942 |
| 2,383,322 | Koch | Aug. 21, 1945 |
| 2,487,857 | Davis | Nov. 15, 1949 |
| 2,505,754 | Combs | May 2, 1950 |
| 2,545,681 | Zepp | Mar. 20, 1951 |
| 2,558,454 | Nienaber | June 26, 1951 |
| 2,567,860 | Shapiro | Sept. 11, 1951 |
| 2,598,857 | Sziklai | June 3, 1952 |
| 2,665,377 | Krepps | Jan. 5, 1954 |

OTHER REFERENCES

Advertisement at page 129 of January 1949 of QST magazine.